(12) United States Patent
Hamajima et al.

(10) Patent No.: US 10,040,891 B2
(45) Date of Patent: Aug. 7, 2018

(54) SILICONE COMPOSITION, SILICONE EMULSION COMPOSITION, AND FIBER TREATMENT AGENT

(71) Applicant: SHIN-ETSU CHEMICAL CO., LTD., Tokyo (JP)

(72) Inventors: Yuta Hamajima, Annaka (JP); Motohiko Hirai, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/302,856

(22) PCT Filed: Feb. 24, 2015

(86) PCT No.: PCT/JP2015/055143
§ 371 (c)(1),
(2) Date: Oct. 7, 2016

(87) PCT Pub. No.: WO2015/156043
PCT Pub. Date: Oct. 15, 2015

(65) Prior Publication Data
US 2017/0029555 A1 Feb. 2, 2017

(30) Foreign Application Priority Data

Apr. 10, 2014 (JP) .................................. 2014-081119
Apr. 10, 2014 (JP) .................................. 2014-081135

(51) Int. Cl.
C08G 18/61 (2006.01)
C08G 77/24 (2006.01)
C08G 77/26 (2006.01)
C08G 18/48 (2006.01)
C08G 18/73 (2006.01)
C08G 18/80 (2006.01)
C08G 18/02 (2006.01)
C08G 18/10 (2006.01)
C08G 18/18 (2006.01)
C08G 18/28 (2006.01)

(52) U.S. Cl.
CPC ........... C08G 18/61 (2013.01); C08G 18/022 (2013.01); C08G 18/10 (2013.01); C08G 18/1875 (2013.01); C08G 18/2865 (2013.01); C08G 18/4825 (2013.01); C08G 18/73 (2013.01); C08G 18/808 (2013.01); C08G 18/8077 (2013.01); C08G 77/26 (2013.01)

(58) Field of Classification Search
CPC ..... C08G 18/61; C08L 83/08; D06M 15/6436
USPC .............................................. 252/8.61–8.63
See application file for complete search history.

(56) References Cited

U.S. PATENT DOCUMENTS

| 3,449,289 A * | 6/1969 | Williams ............. C08K 5/0025 524/266 |
| 4,680,366 A | 7/1987 | Tanaka et al. |
| 4,701,488 A | 10/1987 | Williams |
| 5,718,954 A | 2/1998 | Sano et al. |
| 8,329,255 B2 * | 12/2012 | Jiang ....................... C08L 83/06 252/8.61 |
| 2014/0109795 A1* | 4/2014 | Hirai ....................... C08L 83/12 106/287.11 |

FOREIGN PATENT DOCUMENTS

| EP | 0 157 499 A1 | 10/1985 |
| EP | 0 159 120 A1 | 10/1985 |
| GB | 1 598 845 | 9/1981 |
| JP | 48-1480 | 1/1973 |
| JP | 54-43614 B2 | 12/1979 |
| JP | 57-43673 B2 | 9/1982 |

(Continued)

OTHER PUBLICATIONS

Machine translation of JP 2004-59609 into English (no date).*
Abstract for CN 102585229 A (Jul. 2012).*
Abstract for JP 2004168935 A (Jun. 2004).*
Abstract for EP 1258503 A1 (Nov. 2002).*
Extended European Search Report dated Oct. 19, 2017, in European Patent Application No. 15776936.5.
International Search Report for PCT/JP2015/055143 dated Jun. 2, 2015.

Primary Examiner — Marc S Zimmer
(74) Attorney, Agent, or Firm — Birch, Stewart, Kolasch & Birch, LLP

(57) ABSTRACT

Provided is a silicone composition having high curability even under low-temperature treatment conditions, and exceptional storage stability, the silicone composition being capable of imparting excellent flexibility to fibers as a fiber treatment agent, and also having exceptional washing durability; specifically, a silicone composition containing (A) 70-98 parts by mass of organopolysiloxane having a group represented by formula (1) at the end of the molecule or in a side chain

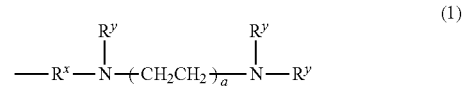

(1)

(in the formula, $R^x$ is a C1-8 divalent hydrocarbon group, a is an integer of 0-4, $R^y$ are each independently a hydrogen atom, C1-10 monovalent hydrocarbon group, or acyl group, and at least one group shown by $R^y$ is hydrogen) and (B) 2-30 parts by mass of blocked polyisocyanate having two or more isocyanate groups per molecule, 50% or more of these isocyanate groups being blocked by a thermally dissociable blocking agent.

10 Claims, No Drawings

(56) References Cited

FOREIGN PATENT DOCUMENTS

| | | |
|---|---|---|
| JP | 59-179887 A | 10/1984 |
| JP | 60-185879 A | 9/1985 |
| JP | 60-185880 A | 9/1985 |
| JP | 61-296184 A | 12/1986 |
| JP | 64-1588 B2 | 1/1989 |
| JP | 64-61576 A | 3/1989 |
| JP | 7-41733 A | 2/1995 |
| JP | 7-279053 A | 10/1995 |
| JP | 9-21071 A | 1/1997 |
| JP | 11-158779 A | 6/1999 |
| JP | 3199609 B2 | 8/2001 |
| JP | 2002-146680 A | 5/2002 |
| JP | 2004-59609 A | 2/2004 |
| JP | 2006-136351 A | 6/2006 |
| JP | 2011-1419 A | 1/2011 |
| WO | WO 2012/061699 A2 | 5/2012 |

* cited by examiner

SILICONE COMPOSITION, SILICONE EMULSION COMPOSITION, AND FIBER TREATMENT AGENT

TECHNICAL FIELD

This invention relates to blocked polyisocyanate-containing curable silicone compositions. More specifically, the invention relates to silicone compositions, silicone emulsion compositions and textile treatments which have an excellent low-temperature curability.

BACKGROUND ART

A variety of organopolysiloxanes such as dimethylpolysiloxane, epoxy group-containing polysiloxanes and aminoalkyl group-containing polysiloxanes are widely used as treatments for conferring properties such as softness and smoothness to various types of textile fibers and products. Of these, frequent use is made of aminoalkyl group-containing organopolysiloxanes, which are able to impart an especially good softness to a variety of textile fibers and products. In particular, textile treatments in which the main ingredient is an organopolysiloxane having aminoalkyl groups such as $-C_3H_6NH_2$ or $-C_3H_6NHCH_2CH_2NH_2$ (see, for example, JP-B S48-1480, JP-B S54-43614, JP-B S57-43673, JP-A S60-185879, JP-A S60-185880 and JP-A S64-61576) exhibit excellent softening properties and are thus widely used.

In recent years, there has been a growing need for enhanced functionality in apparel. Hence, in the field of textile treatment, in order to impart fibers with various functions, functional finishes such as deodorizers, antimicrobial agents, disperse pigments and disperse dyes are applied onto the fibers using resin binders. For example, in JP-A H07-279053, improvements in preventing silk fibroin powder loss and in adhesion to fibers are carried out with textile treatments obtained by adding silk fibroin to a resin emulsion of polyurethane resin, polyester resin, acrylic resin or the like. JP-A H07-41733 discloses a powdered natural product-containing surface treatment which, by applying a powdered natural product and a urea-aldehyde resin powder or the like to a substrate with a synthetic resin binder such as urethane resin, acrylic resin or polyester resin, imparts qualities similar to the natural product and suppresses the generation of unpleasant odors during coating.

In order to retain for a long time such functions of softness and water absorbency possessed by the textile treatment itself, and the functions exhibited by various finishes, such as deodorizing and antimicrobial functions, it is necessary for the various treatments and functional finishes to continue adhering to the fibers even when washing is repeatedly carried out. Hence, textile treatments and resin binders are required to have a high durability to washing.

Prior-art documents relating to this invention include those cited below.

PRIOR ART DOCUMENTS

Patent Documents

Patent Document 1: JP-B S48-1480
Patent Document 2: JP-B S54-43614
Patent Document 3: JP-B S57-43673
Patent Document 4: JP-A S60-185879
Patent Document 5: JP-A S60-185880
Patent Document 6: JP-A S64-61576
Patent Document 7: JP-A S59-179887
Patent Document 8: JP-B S64-1588
Patent Document 9: JP No. 3199609
Patent Document 10: JP-A H07-279053
Patent Document 11: JP-A H07-41733

SUMMARY OF THE INVENTION

Problems to be Solved by the Invention

However, the softness and wash durability desired in textile finishing are qualities that work against each other. Specifically, when a textile treatment or binder resin having high wash durability is used in textile finishing, there tends to be a loss of softness. Another problem is that high-temperature treatment is required when applying a binder onto fibers.

It is therefore an object of this invention to provide compositions which have a high curability even under low-temperature treatment conditions and also have an excellent shelf stability, and which, as textile treatments, can impart fibers with a good softness and moreover possesses an excellent durability to washing.

Means for Solving the Problems

As a result of extensive investigations, the inventors have discovered that silicone compositions which include 70 to 98 parts by weight of an organopolysiloxane containing an amino group of formula (1) below and 2 to 30 parts by weight of a specific blocked polyisocyanate exhibit excellent curability even at low temperatures and also have an excellent shelf stability. They have found as well that by using such compositions in textile treatments, good softness can be imparted to fibers and that high durability to washing is also exhibited.

In addition, the inventors have discovered that silicone compositions which include 70 to 98 parts by weight of an organopolysiloxane having, at an end of the molecule or on a side chain, a specific group of formula (5) below and 2 to 30 parts by weight of a specific blocked polyisocyanate exhibit excellent curability even at low temperatures and also have an excellent shelf stability. They have found as well that by using such compositions in textile treatments, good softness and water absorbency can be imparted to fibers and that high durability to washing is also exhibited.

Accordingly, the invention provides the following silicone compositions, silicone emulsion compositions and textile treatments.

[1] A silicone composition comprising:
(A) 70 to 98 parts by weight of an organopolysiloxane having, at an end of the molecule or on a side chain, a group of general formula (1) below

[Chemical Formula 1]

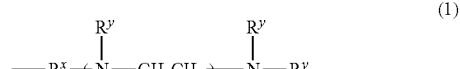

(wherein $R^x$ is a divalent hydrocarbon group of 1 to 8 carbon atoms; the letter "a" is an integer from 0 to 4; and each $R^y$ is independently a hydrogen atom, a monovalent hydrocarbon group of 1 to 10 carbon atoms or an acyl group, with the proviso that at least one $R^y$ is a hydrogen atom); and (B) 2 to 30 parts by weight of a blocked polyisocyanate which has at least two isocyanate groups per molecule, at least 50 mol % of the isocyanate groups being capped with a thermally labile blocking agent.

[2] The silicone composition of [1], wherein component (A) is selected from among organopolysiloxanes of general formulas (2) to (4) below

[Chemical Formula 2]

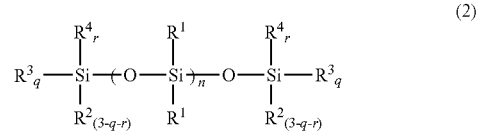
(2)

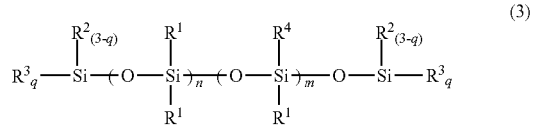
(3)

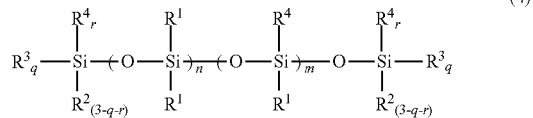
(4)

[wherein each $R^4$ is independently a group of general formula (1) below

[Chemical Formula 3]

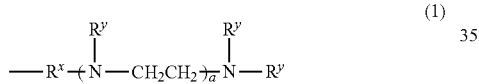
(1)

($R^x$ being a divalent hydrocarbon group of 1 to 8 carbon atoms; the letter "a" being an integer from 0 to 4; and each $R^y$ being independently a hydrogen atom, a monovalent hydrocarbon group of 1 to 10 carbon atoms or an acyl group, with the proviso that at least one $R^y$ is a hydrogen atom); each $R^2$ is independently a substituted or unsubstituted monovalent hydrocarbon group of 1 to 12 carbon atoms; each $R^3$ is independently —OX (X being a hydrogen atom or a substituted or unsubstituted monovalent hydrocarbon group of 1 to 12 carbon atoms); each $R^1$ is independently a group selected from the options for $R^2$ or $R^3$; each q is independently an integer from 0 to 3 and each r is independently 0 or 1, such that the sum q+r is 0 to 3 at each end, with the proviso that at least one end in general formula (2) and general formula (4) has a $R^4$; n is an integer from 10 to 500; and m is an integer from 1 to 10].

[3] A silicone composition comprising:
(A') 70 to 98 parts by weight of an organopolysiloxane having, at an end of the molecule or on a side chain, a group of general formula (5) below

[Chemical Formula 4]

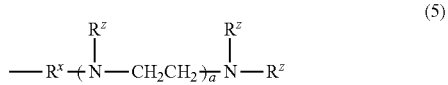
(5)

[wherein $R^x$ is a divalent hydrocarbon group of 1 to 8 carbon atoms; the letter "a" is an integer from 0 to 4; and each $R^z$ is independently a hydrogen atom, a monovalent hydrocarbon group of 1 to 10 carbon atoms, an acyl group or the polyoxyalkylene-containing organic group —$CH_2$—$CH$ $(OH)CH_2O$—$(C_2H_4O)_b$—$(C_3H_6O)_c$—Z (Z being a hydrogen atom, a substituted or unsubstituted monovalent hydrocarbon group of 1 to 12 carbon atoms or an acyl group, b being an integer from 2 to 30, c being an integer from 0 to 20, and the oxyethylene and oxypropylene units optionally forming a block polymer or a random polymer), with the proviso that at least 90% of the total number of $R^z$ groups are —$CH_2$—$CH(OH)CH_2O$—$(C_2H_4O)_b$—$(C_3H_6O)_c$—Z groups]; and (B) 2 to 30 parts by weight of a blocked polyisocyanate which has at least two isocyanate groups per molecule, at least 50 mol % of the isocyanate groups being capped with a thermally labile blocking agent.

[4] The silicone composition of [3], wherein component (A') is selected from among organopolysiloxanes of general formulas (6) to (8) below

[Chemical Formula 5]

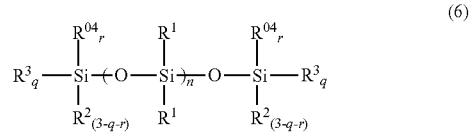
(6)

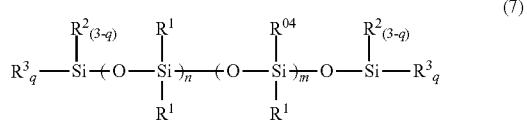
(7)

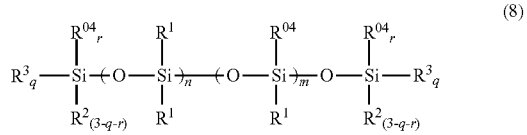
(8)

[wherein each $R^{04}$ of general formula (6) to (8) is independently a group of general formula (5) below

[Chemical Formula 6]

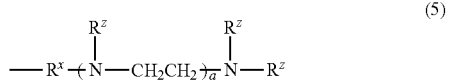
(5)

(wherein $R^x$ is a divalent hydrocarbon group of 1 to 8 carbon atoms; the letter "a" is an integer from 0 to 4; and each $R^x$ is independently a hydrogen atom, a monovalent hydrocarbon group of 1 to 10 carbon atoms, an acyl group or the polyoxyalkylene-containing organic group —$CH_2$—$CH$ $(OH)CH_2O$—$(C_2H_4O)_b$—$(C_3H_6O)_c$—Z (wherein Z is a hydrogen atom, a substituted or unsubstituted monovalent hydrocarbon group of 1 to 12 carbon atoms or an acyl group, b is an integer from 2 to 30, c is an integer from 0 to 20, and the oxyethylene and oxypropylene units optionally form a block polymer or a random polymer), with the proviso that at least 90% of the total number of $R^z$ groups are —$CH_2$— $CH(OH)CH_2O$—$(C_2H_4O)_b$—$(C_3H_6O)_c$—Z groups); each $R^2$ is independently a substituted or unsubstituted monovalent hydrocarbon group of 1 to 12 carbon atoms; each $R^3$ is independently the group —OX (X being a hydrogen atom or a substituted or unsubstituted monovalent hydrocarbon group of 1 to 12 carbon atoms); each $R^1$ is independently a group selected from the options for $R^2$ or $R^3$; each q is independently an integer from 0 to 3 and each r is independently 0 or 1, such that the sum q+r is 0 to 3 at each end, with the proviso that at least one end in formula (6) and formula (8) has a $R^{o4}$; n is an integer from 10 to 500; and m is an integer from 1 to 10].

[5] The silicone composition of any one of [1] to [4], wherein component (B) is a blocked polyisocyanate obtained by using a heat-labile blocking agent to cap a polyisocyanate compound polymerized from an aliphatic and/or alicyclic diisocyanate.

[6] The silicone composition of any one of [1] to [5], wherein the thermally labile blocking agent of component (B) is at least one compound selected from the group consisting of oxime compounds, pyrazole compounds and active ethylene compounds.

[7] The silicone composition of any one of [1] to [6] which includes, as component (A) or (A') and component (B), a reaction product of at least one NH group included in the organopolysiloxane of component (A) or (A') with an isocyanate group of component (B).

[8] A silicone emulsion composition comprising the silicone composition of any one of [1] to [7].

[9] A textile treatment comprising the silicone composition of any one of [1] to [7].

Advantageous Effects of the Invention

The silicone compositions of the invention have excellent low-temperature curability and shelf stability. Textile treatments using these are able to confer textiles with good softness and also have excellent durability to washing. In particular, the silicone compositions of [3] and [4] above can impart textiles with excellent water absorbency.

EMBODIMENT FOR CARRYING OUT THE INVENTION

The invention is described more fully below.
[Silicone Compositions]

The silicone composition of the invention includes 70 to 98 parts by weight of organopolysiloxane (A) or (A') below, and (B) 2 to 30 parts by weight of a blocked polyisocyanate.

The organopolysiloxane of component (A) is an organopolysiloxane having, at an end of the molecule or on a side chain, a group of general formula (1) below.

[Chemical Formula 7]

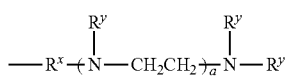

(1)

Here, $R^x$ is a divalent hydrocarbon group of 1 to 8 carbon atoms; the letter "a" is an integer from 0 to 4; and each $R^y$ is independently a hydrogen atom, a monovalent hydrocarbon group of 1 to 10 carbon atoms or an acyl group, with the proviso that at least one $R^y$ is a hydrogen atom. One such organopolysiloxane may be used alone, or two or more may used in suitable combination.

The organopolysiloxane of component (A') is an organopolysiloxane having, at an end of the molecule or on a side chain, a group of general formula (5) below.

[Chemical Formula 8]

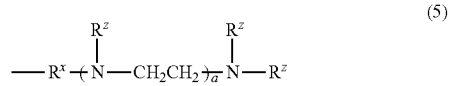

(5)

Here, $R^x$ is a divalent hydrocarbon group of 1 to 8 carbon atoms; the letter "a" is an integer from 0 to 4; and each $R^x$ is independently a hydrogen atom, a monovalent hydrocarbon group of 1 to 10 carbon atoms, an acyl group, or the polyoxyalkylene-containing organic group —$CH_2$—CH(OH)$CH_2$O—$(C_2H_4O)_b$—$(C_3H_6O)_c$—Z (wherein Z is a hydrogen atom, a substituted or unsubstituted monovalent hydrocarbon group of 1 to 12 carbon atoms or an acyl group, b is an integer from 2 to 30, c is an integer from 0 to 20, and the oxyethylene and oxypropylene units may form a block polymer or a random polymer), with the proviso that at least 90% of the total number of $R^x$ groups are —$CH_2$—CH(OH)$CH_2$O—$(C_2H_4O)_b$—$(C_3H_6O)_c$—Z groups. One such organopolysiloxane may be used alone, or two or more may used in suitable combination.

The organopolysiloxane of the invention has a structure that may be linear, branched or cyclic, although a linear structure is preferred. In the organopolysiloxane, the group of general formula (1) is bonded to a silicon atom on the polysiloxane backbone, and may be present at an end of the molecule or on a side chain. The organopolysiloxane has at least one, preferably two or more, and most preferably 2 to 10, groups of general formula (1) per molecule.

In general formulas (1) and (5), $R^x$ is a divalent hydrocarbon group of 1 to 8 carbon atoms. Preferred examples of the divalent hydrocarbon group include alkylene groups such as methylene, ethylene, propylene and butylene groups. Of these, a propylene group is preferred. The letter "a" is an integer from 0 to 4, and is preferably 1 or 2.

In general formula (1), each $R^y$ is independently a hydrogen atom, a monovalent hydrocarbon group of 1 to 10 carbon atoms or an acyl group. Of these $R^y$ groups, at least one is a hydrogen atom. Of the total number of $R^y$ groups, preferably at least 33 wt %, and more preferably at least 50%, are hydrogen atoms. This number has no particular upper limit, and may even be 100%.

Exemplary monovalent hydrocarbon group of 1 to 10 carbon atoms that may serve as $R^y$ groups include alkyl groups and aryl groups, with methyl, ethyl, propyl, butyl, vinyl, allyl and phenyl groups being preferred.

In general formula (5), each $R^z$ is independently a hydrogen atom, a monovalent hydrocarbon group of 1 to 10 carbon atoms, an acyl group or the polyoxyalkylene-containing organic group —$CH_2$—CH(OH)$CH_2$O—$(C_2H_4O)_b$ —$(C_3H_6O)_c$—Z (wherein Z is a hydrogen atom, a substituted or unsubstituted monovalent hydrocarbon group of 1 to 12 carbon atoms or an acyl group, b is an integer from 2 to 30, c is an integer from 0 to 20, and the oxyethylene units and oxypropylene units may form a block polymer or a random polymer).

The letter "b" is an integer from 2 to 30, and preferably an integer from 2 to 20. When b is smaller than this lower limit value, the effect of imparting textiles with both softness and hydrophilicity (water absorbency) is inadequate; when b is larger than this upper limit value, the softness is inadequate. The letter "c" is an integer from 0 to 20, preferably an integer from 0 to 10, and more preferably an integer from 0 to 5. When c is larger than this upper limit value, the hydrophilicity (water absorbency) of the textile is inadequate. The polyoxyethylene unit and the polyoxypropylene unit may form a polymer of one type of unit or a copolymer of two types of units; also, they may form a block polymer or a random polymer.

In the polyoxyalkylene-containing organic group, Z is a hydrogen atom, a substituted or unsubstituted monovalent hydrocarbon group of 1 to 12 carbon atoms, and preferably 1 to 8 carbon atoms, or an acyl group. The monovalent hydrocarbon group of 1 to 12 carbon atoms is exemplified by alkyl groups such as methyl, ethyl, propyl, butyl, pentyl, hexyl, heptyl, octyl, nonyl, decyl, dodecyl, tetradecyl, hexadecyl, octadecyl and eicosyl; cycloalkyl groups such as cyclopentyl and cyclohexyl; aryl groups such as phenyl and tolyl; alkenyl groups such as vinyl and allyl; and halogenated alkyl groups, halogenated alkenyl groups and the like obtained by substituting some or all of the hydrogen atoms bonded to carbon atoms in the foregoing groups with halogen atoms such as chlorine or fluorine. Of these, Z is preferably a hydrogen atom, an alkyl group such as methyl, ethyl, propyl or butyl, or an acyl group such as acetyl or benzoyl, and is more preferably a methyl, butyl or acetyl group.

The monovalent hydrocarbon group of 1 to 10 carbon atoms serving as $R^z$ is exemplified by alkyl groups and aryl groups, of which preferred examples include methyl, ethyl, propyl, butyl, vinyl, allyl and phenyl groups.

Component (A) is preferably an organopolysiloxane of any of general formulas (2) to (4) below.

[Chemical Formula 9]

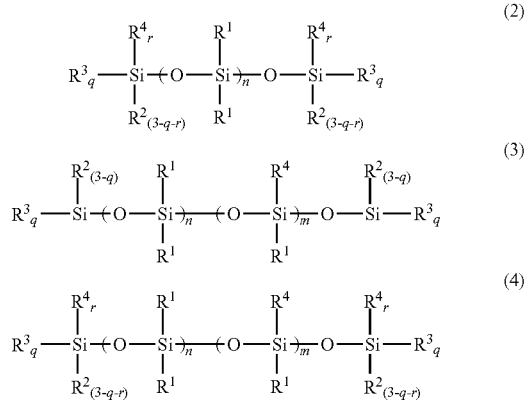

In these formulas, each $R^4$ is independently a group of general formula (1) below.

[Chemical Formula 10]

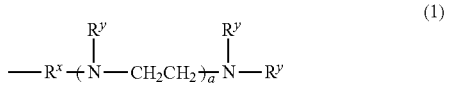

Here, $R^x$ is a divalent hydrocarbon group of 1 to 8 carbon atoms; the letter "a" is an integer from 0 to 4; and each $R^y$ is independently a hydrogen atom, a monovalent hydrocarbon group of 1 to 10 carbon atoms or an acyl group, with the proviso that at least one $R^y$ is a hydrogen atom. Each $R^2$ is independently a substituted or unsubstituted monovalent hydrocarbon group of 1 to 12 carbon atoms; each $R^3$ is independently the group —OX (wherein X is a hydrogen atom or a substituted or unsubstituted monovalent hydrocarbon group of 1 to 12 carbon atoms); and each $R^1$ is independently a group selected from the options for $R^2$ or $R^3$. Also, each q is independently an integer from 0 to 3 and each r is independently 0 or 1, such that the sum q+r is 0 to 3 at each end, with the proviso that at least one end in general formula (2) and general formula (4) has a $R^4$. Additionally, n is an integer from 10 to 500; and m is an integer from 1 to 10.

Each $R^4$ is independently a group of general formula (1), with the preferred range, etc. being the same as described above.

Each $R^2$ is independently a substituted or unsubstituted monovalent hydrocarbon group of 1 to 12 carbon atoms, and preferably 1 to 8 carbon atoms. The monovalent hydrocarbon group is exemplified by alkyl groups such as methyl, ethyl, propyl, butyl, pentyl, hexyl, heptyl, octyl, nonyl, decyl, dodecyl, tetradecyl, hexadecyl, octadecyl and eicosyl; cycloalkyl groups such as cyclopentyl and cyclohexyl; aryl groups such as phenyl and tolyl; alkenyl groups such as vinyl and allyl; and halogenated alkyl groups, halogenated alkenyl groups and the like obtained by substituting some or all of the hydrogen atoms bonded to carbon atoms in the foregoing groups with halogen atoms such as chlorine or fluorine. Of these, a methyl group is industrially preferred.

Each $R^3$ is independently the group —OX, with X being a hydrogen atom or a substituted or unsubstituted monovalent hydrocarbon group of 1 to 12 carbon atoms, and preferably 1 to 8 carbon atoms. X is preferably a hydrogen atom or an alkyl group such as methyl, ethyl, propyl, butyl, pentyl, hexyl, heptyl or octyl. $R^3$ is preferably a hydroxyl, methoxy or ethoxy group.

Each $R^1$ is independently selected from the options for $R^2$ and $R^1$.

Each q is independently an integer from 0 to 3, each r is independently 0 or 1, and the sum q+r at each end is from 0 to 3, provided that general formula (2) and general formula (4) have a $R^4$ on at least one end. General formulas (2) to (4) preferably have at least one $R^3$ on the molecule. Also, q is preferably 1 or 2, and more preferably 1, with q being most preferably 1 at both ends. In general formula (2), r is preferably 1 at both ends.

The letter "n" is an integer from 10 to 500, and preferably from 20 to 200. When n is smaller than this lower limit, the textile softness or smoothness imparting effect may be inadequate. On the other hand, when n is larger than this upper limit, the organopolysiloxane following the introduction of polyoxyalkylene groups has a high viscosity, which may make it difficult to handle and emulsify. Also, m is an integer from 1 to 10. When m is larger than this upper limit, yellowing tends to arise.

Examples of the organopolysiloxanes of general formulas (2) to (4) include those having the following general formulas.

[Chemical Formula 11]

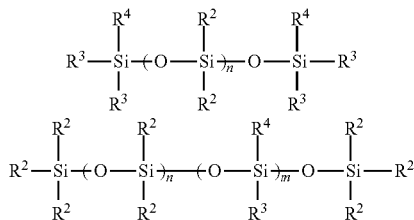

-continued

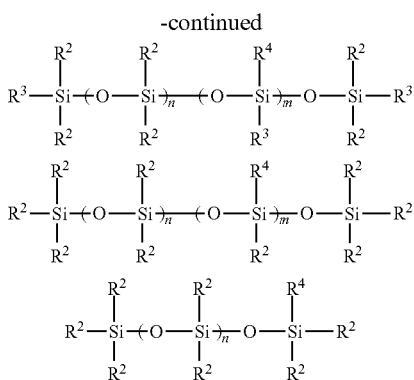

In these formulas, $R^2$, $R^3$, $R^4$, n and m are as defined above.

Of these, organopolysiloxanes of the following general formula are especially preferred.

[Chemical Formula 12]

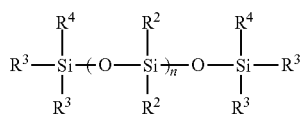

Here, $R^2$, $R^3$, $R^4$ and n are as defined above.

Organopolysiloxanes of general formulas (2) to (4) are exemplified by organopolysiloxanes of general formulas (9) to (11) below.

[Chemical Formula 13]

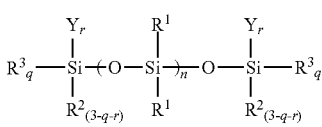

(9)

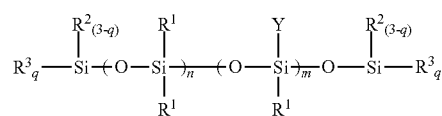

(10)

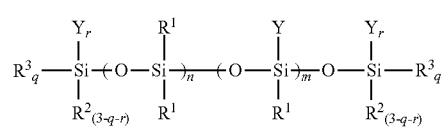

(11)

Here, $R^1$, $R^2$, $R^3$, n, m, q and r are as defined above, and Y is the group —$R^y$(NHCH$_2$CH$_2$)$_a$NH$_2$ (wherein $R^y$ and the letter "a" are as defined above).

Amino group-containing organopolysiloxanes of general formula (9) can easily be obtained by a known synthesis process. For example, they can be obtained by a demethanolization reaction between a dimethylpolysiloxane capped at both ends with hydroxyl groups and 3-aminopropyldimethoxymethylsilane or N-(2-aminoethyl)-3-aminopropyldimethoxymethylsilane, either in the absence of a catalyst or in the presence of a catalyst such as an alkali metal hydroxide.

Amino group-containing organopolysiloxanes of general formula (10) or (11) also can be easily obtained by a known synthesis process. For example, they can be obtained by an equilibration reaction between a cyclic siloxane such as octamethylcyclotetrasiloxane and 3-aminopropyldiethoxymethylsilane, N-(2-aminoethyl)-3-aminopropyldimethoxymethylsilane or a hydrolyzate of either, and also, as another starting material, a compound selected from among hexamethyldisiloxane and the like, in the presence of a catalyst such as an alkali metal hydroxide or tetramethylammonium hydroxide.

Component (A) may have branches on the organopolysiloxane backbone. Examples of organopolysiloxanes having a branched structure include those of general formula (12) below.

[Chemical Formula 14]

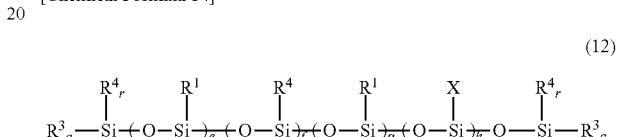

(12)

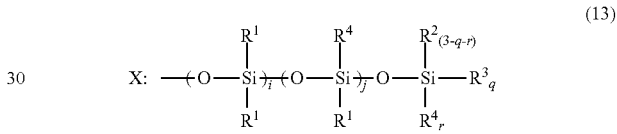

(13)

Here, X is a group of general formula (13) above, and $R^1$, $R^2$, $R^3$, $R^4$, q and r are as defined above. Also, e and i are each independently integers from 10 to 500, with the sum e+i being from 10 to 500, and preferably from 20 to 200; f and j are each independently integers from 0 to 20, with the sum f+j being from 1 to 20, and preferably from 2 to 10; g is an integer from 1 to 200; and h is an integer from 0 to 200.

Component (A') is preferably an organopolysiloxane of any of general formulas (6) to (8) below.

[Chemical Formula 15]

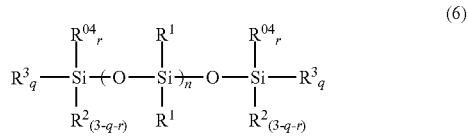

(6)

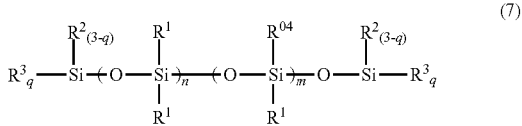

(7)

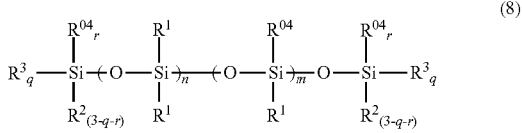

(8)

Here, each $R^{04}$ of general formula (6) to (8) is independently a group of general formula (5) below.

[Chemical Formula 16]

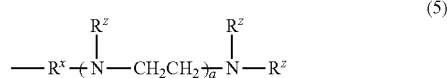

(5)

In formula (5), $R^x$ is a divalent hydrocarbon group of 1 to 8 carbon atoms; the letter "a" is an integer from 0 to 4; and each $R^z$ is independently a hydrogen atom, a monovalent hydrocarbon group of 1 to 10 carbon atoms, an acyl group or the polyoxyalkylene-containing organic group —$CH_2$—$CH(OH)CH_2O$—$(C_2H_4O)_b$—$(C_3H_6O)_c$—Z (wherein Z is a hydrogen atom, a substituted or unsubstituted monovalent hydrocarbon group of 1 to 12 carbon atoms or an acyl group, b is an integer from 2 to 30, c is an integer from 0 to 20, and the oxyethylene and oxypropylene units may form a block polymer or a random polymer). At least 90% of the total number of $R^z$ groups are —$CH_2$—$CH(OH)CH_2O$—$(C_2H_4O)_b$—$(C_3H_6O)_c$—Z groups.

Also, in formulas (6) to (8), each $R^2$ is independently a substituted or unsubstituted monovalent hydrocarbon group of 1 to 12 carbon atoms; each $R^3$ is independently the group —OX (X being a hydrogen atom or a substituted or unsubstituted monovalent hydrocarbon group of 1 to 12 carbon atoms); and each $R^1$ is independently a group selected from the options for $R^2$ or $R^3$. In addition, each q is independently an integer from 0 to 3 and each r is independently 0 or 1, such that the sum q+r is 0 to 3 at each end, with the proviso that at least one end in general formula (6) and general formula (8) has a $R^4$; n is an integer from 10 to 500; and m is an integer from 1 to 10.

Each $R^{04}$ is independently a polyoxyalkylene-containing organic group of general formula (5), with the preferred range, etc. being the same as described above. In the organopolysiloxanes of general formulas (6) to (8), preferably at least 2, and more preferably at least 3, of the $R^z$ groups in each molecule are polyoxyalkylene-containing organic groups. This enables an excellent softness and hydrophilicity (water absorbency) to be imparted to textiles, and also enables textile yellowing to be reduced.

Each $R^2$ is independently a substituted or unsubstituted monovalent hydrocarbon group of 1 to 12 carbon atoms, and preferably 1 to 8 carbon atoms. The monovalent hydrocarbon group is exemplified by alkyl groups such as methyl, ethyl, propyl, butyl, pentyl, hexyl, heptyl, octyl, nonyl, decyl, dodecyl, tetradecyl, hexadecyl, octadecyl and eicosyl; cycloalkyl groups such as cyclopentyl and cyclohexyl; aryl groups such as phenyl and tolyl; alkenyl groups such as vinyl and allyl; and halogenated alkyl groups, halogenated alkenyl groups and the like obtained by substituting some or all of the hydrogen atoms bonded to carbon atoms in the foregoing groups with halogen atoms such as chlorine or fluorine. Of these, a methyl group is industrially preferred.

Each $R^3$ is independently the group —OX, wherein X is a hydrogen atom or a substituted or unsubstituted monovalent hydrocarbon group of 1 to 12 carbon atoms, and preferably 1 to 8 carbon atoms. X is preferably a hydrogen atom or an alkyl group such as methyl, ethyl, propyl, butyl, pentyl, hexyl, heptyl or octyl. Of these, $R^3$ is preferably a hydroxyl, methoxy or ethoxy group.

Each $R^1$ is independently selected from the options for $R^2$ and $R^3$.

Each q is independently an integer from 0 to 3, each r is independently 0 or 1, and the sum q+r at each end is from 0 to 3, provided that general formula (6) and general formula (8) have a $R^4$ on at least one end. General formulas (6) to (8) preferably have at least one $R^3$ on the molecule. Also, q is preferably 1 or 2, and more preferably 1, with q being most preferably 1 at both ends. In general formula (6), r is preferably 1 at both ends.

The letter "n" is an integer from 10 to 500, and preferably from 20 to 200. When n is smaller than this lower limit, the textile softness or smoothness imparting effect may be inadequate. On the other hand, when n is larger than this upper limit, the organopolysiloxane following the introduction of polyoxyalkylene groups has a high viscosity, which may make it difficult to handle and emulsify. Also, m is an integer from 1 to 10. When m is larger than this upper limit, yellowing tends to arise. Of the total number of $R^z$ groups, it is preferable for 2 or more to be the above polyoxyalkylene-containing organic groups. In each of the general formulas, at least 90%, preferably at least 99%, and more preferably 100%, of the total number of $R^z$ groups are the above polyoxyalkylene-containing organic groups. At less than 90%, the shelf stability decreases and textiles cannot be fully imparted with both softness and water absorbency.

Examples of the organopolysiloxanes of general formulas (6) to (8) include those having the following general formulas.

[Chemical Formula 17]

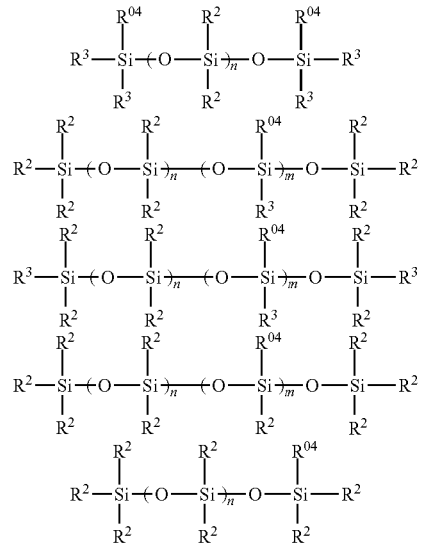

In these formulas, $R^z$, $R^3$, $R^{04}$, n and m are as defined above.

Of these, organopolysiloxanes of the following general formula are especially preferred.

[Chemical Formula 18]

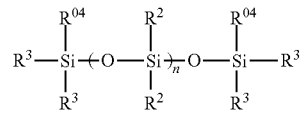

Here, $R^2$, $R^3$, $R^4$ and n are as defined above.

Organopolysiloxanes of above general formulas (6) to (8) can be easily obtained by reacting organopolysiloxanes of general formulas (14) to (16) below with a polyoxyalkylene glycidyl ether of general formula (17) below.

[Chemical Formula 19]

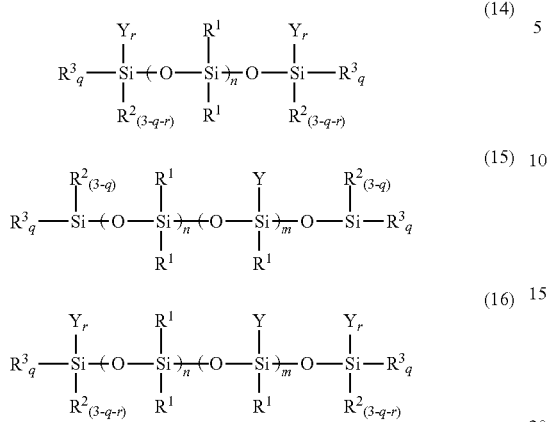

In formulas (14) to (16), $R^1$, $R^2$, $R^3$, n, m, q and r are as defined above, and Y is the group $-R^z(NHCH_2CH_2)_aNH_2$ ($R^z$ and the letter "a" being as defined above).

[Chemical Formula 20]

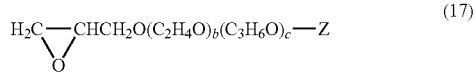

In formula (17), b, c and Z are as defined above.

The organopolysiloxanes of general formulas (14) to (16) above are exemplified as follows.

[Chemical Formula 21]

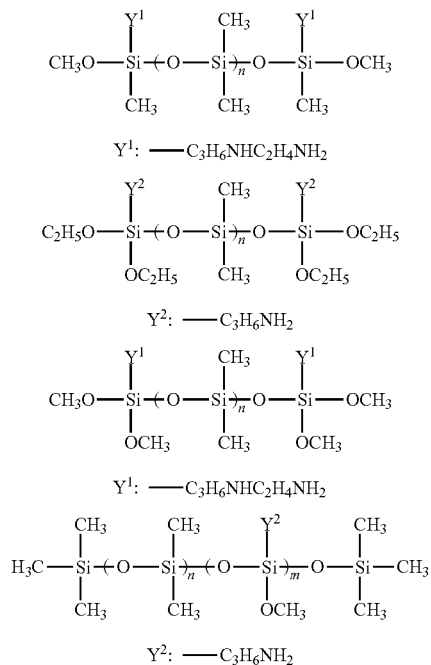

Here, n and m are as defined above.

Amino group-containing organopolysiloxanes of general formula (14) can easily be obtained by a known synthesis process. For example, they can be obtained by a demethanolization reaction between a dimethylpolysiloxane capped at both ends with hydroxyl groups and 3-aminopropyldimethoxymethylsilane or N-(2-aminoethyl)-3-aminopropyldimethoxymethylsilane, either in the absence of a catalyst or in the presence of a catalyst such as an alkali metal hydroxide.

Amino group-containing organopolysiloxanes of general formula (15) and (16) also can be easily obtained by a known synthesis process. For example, they can be obtained by an equilibration reaction between a cyclic siloxane such as octamethylcyclotetrasiloxane and 3-aminopropyldiethoxymethylsilane, N-(2-aminoethyl)-3-aminopropyldimethoxymethylsilane or a hydrolyzate of either, and also, as another starting material, a compound selected from among hexamethyldisiloxane and the like, in the presence of a catalyst such as an alkali metal hydroxide or tetramethylammonium hydroxide.

Examples of the polyoxyalkylene monoglycidyl ether of general formula (17) include the following.

[Chemical Formula 22]

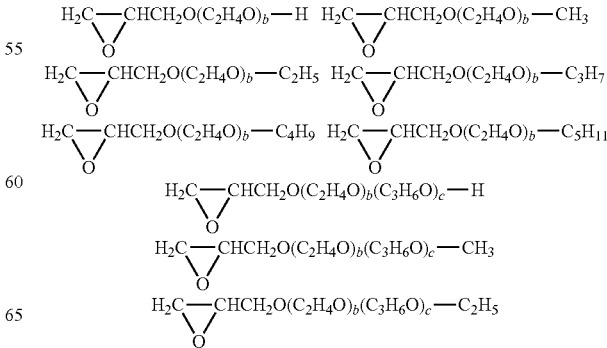

-continued
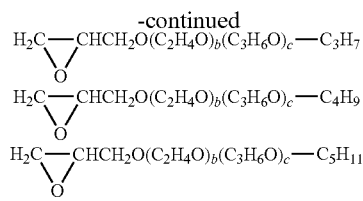

Here, b and c are as defined above.

The organopolysiloxanes of general formulas (14) to (16) and the polyoxyalkylene monoglycidyl ether of general formula (17) should be reacted in a compounding ratio such that preferably at least two $R^z$ groups in the resulting organopolysiloxane are —$CH_2$—$CH(OH)CH_2O$—$(C_2H_4O)_b$ —$(C_3H_6O)_c$—Z groups. In particular it is desirable for the reaction to be carried out such that the ratio of the number of glycidyl groups on the polyoxyalkylene monoglycidyl ether of general formula (17) to the total number of nitrogen-bonded hydrogen atoms (—NH) in the organopolysiloxanes of general formulas (14) to (16) is at least 0.9, and more preferably at least 1.0. At less than 0.9, the shelf stability following mixture with the blocked polyisocyanate serving as component (B) decreases, which is undesirable because thickening and gelling arise with the passage of time. The reaction of an amino group-containing organopolysiloxane with a polyoxyalkylene monoglycidyl ether may be carried out in accordance with methods known to the art, and is not particularly limited. For example, the reaction may be carried out for 1 to 5 hours at 50 to 100° C., either in the absence of a solvent or in the presence of a solvent such as a lower alcohol, toluene or xylene.

Illustrative examples of organopolysiloxanes obtained by reacting an organopolysiloxane of any of general formulas (14) to (16) with a polyoxyalkylene monoglycidyl ether of general formula (17) include the following.

[Chemical Formula 23]

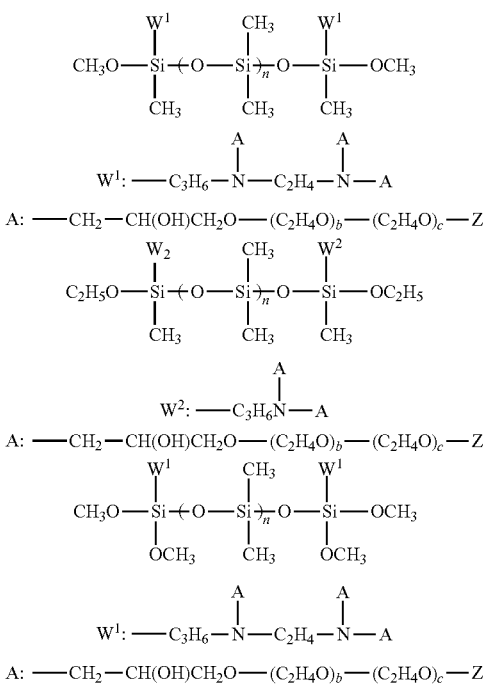

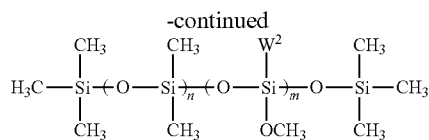

[Chemical Formula 24]

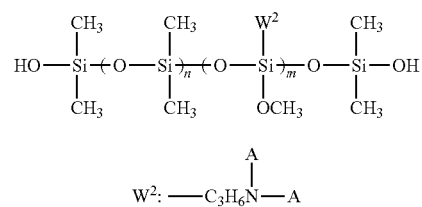

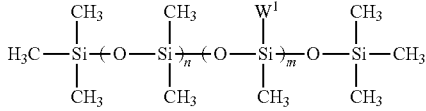

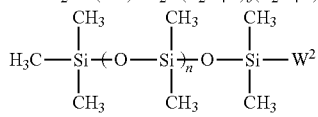

In these formulas, n, m, b, c and Z are as defined above.

Component (A') may have branches in the organopolysiloxane backbone. Organopolysiloxanes having a branched structure are exemplified by those of general formula (18) below.

[Chemical Formula 25]

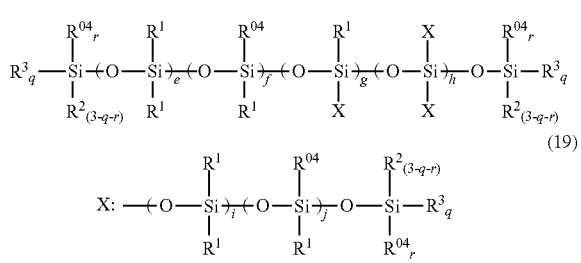

Here, X is a group of general formula (19) above and $R^1$, $R^2$, $R^3$, $R^{04}$, q and r are as defined above. In addition, e and i are each independently an integer of 10 to 500, with the sum e+i being from 10 to 500, and preferably from 20 to 200. Also, f and j are each independently an integer from 0 to 20, with the sum f+j being from 1 to 20, and preferably from 2 to 10. Moreover, g is an integer from 1 to 200, and h is an integer from 0 to 200.

The organopolysiloxane serving as component (A) or component (A') of the invention may be two or more different organopolysiloxanes used together, and has a viscosity at 25° C. of preferably from 50 to 50,000 mPa·s, more preferably from 200 to 3,000 mPa·s, even more preferably from 300 to 2,000 mPa·s, and still more preferably from 400 to 1,000 mPa·s. In this invention, the viscosity is a value measured at 25° C. with a Brookfield (BM-type) viscometer (Tokyo Keiki, Inc.).

(B) Blocked Polyisocyanate

Component (B) is a blocked polyisocyanate having two or more isocyanate groups per molecule, at least 50 mol % of the isocyanate groups being capped with a thermally labile blocking agent. One blocked polyisocyanate may be used alone, or two or more may be used in suitable combination.

Various types of known blocked polyisocyanates may be used as component (B). The blocked polyisocyanate can be prepared by reacting various known polyisocyanate compounds with various known blocking agents.

The polyisocyanate is exemplified by polyisocyanates which are polymers of various diisocyanates such as tolylene diisocyanate, diphenylmethane diisocyanate, m-xylylene diisocyanate, α,α,α',α'-tetramethyl-m-xylylene diisocyanate, tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)cyclohexane and 4,4-dicyclohexylmethane diisocyanate, and which have isocyanurate structures composed of these. Additional examples include polyisocyanates obtained by reacting various diisocyanates such as those mentioned above with various polyols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol, 2,2-diethyl-1,3-propanediol, polypropylene diol, glycerol, trimethylolpropane, pentaerythritol, polyester polyols, polyether polyols, acrylic polyols or polyolefin polyols; polyisocyanates which have a biuret structure and are obtained by reacting a polyisocyanate with water; and polyisocyanates which have an isocyanurate structure and are obtained by the cyclic trimerization of diisocyanates such as those mentioned above. Alternatively, use can be made of polyisocyanates obtained by reacting various polyisocyanates such as those mentioned above with various polyols such as those mentioned above.

Of these, polyisocyanate compounds which are obtained by polymerizing aliphatic or alicyclic diisocyanates, such as tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)cyclohexane and 4,4-dicyclohexylmethane diisocyanate, especially aliphatic or alicyclic diisocyanates having 4 to 30 carbon atoms, and which have an isocyanate structure consisting of these diisocyanate monomers, are preferred. From the standpoint of weather resistance and ready availability, polyisocyanates having an isocyanurate structure consisting of hexamethylene diisocyanate are especially preferred. The polyisocyanate may also include at the same time, for example, biuret groups, urea groups, uretdione groups, urethane groups, allophanate groups, oxadiazinetrione groups or iminooxadiazinedione groups.

Heat-labile blocking agents that can be used in the invention are compounds having one or more active hydrogen on the molecule. Such blocking agents may be used singly, or two or more may be used in suitable combination. Exemplary blocking agents include alcohol compounds, alkylphenol compounds, phenolic compounds, active ethylene-type compounds, mercaptan compounds, acid amide compounds, acid imide compounds, imidazole compounds, urea compounds, oxime compounds, amine compounds, imine compounds and pyrazole compounds.

Specific examples include alcohol compounds such as methanol, ethanol, 2-propanol, n-butanol, sec-butanol, 2-ethyl-1-hexanol, 2-methoxyethanol, 2-ethoxyethanol and 2-butoxyethanol; alkylphenol compounds which are mono- or dialkylphenols having as a substituent an alkyl group of at least 4 carbon atoms, including monoalkylphenols such as n-propylphenol, i-propylphenol, n-butylphenol, sec-butylphenol, t-butylphenol, n-hexylphenol, 2-ethylhexylphenol, n-octylphenol and n-nonylphenol, dialkylphenols such as di-n-propylphenol, diisopropylphenol, isopropylcresol, di-n-butylphenol, di-t-butylphenol, di-sec-butylphenol, di-n-octylphenol, di-2-ethylhexylphenol and di-n-nonylphenol, and phenols such as phenol, cresol, ethylphenol, styrenated phenol and hydroxybenzoic acid esters; active ethylene-type compounds such as dimethyl malonate, diethyl malonate, methyl acetoacetate, ethyl acetoacetate and acetyl acetone; mercaptan compounds such as butylmercaptan and dodecylmercaptan; acid amide compounds such as acetoanilide, acetic acid amide, ε-caprolactam, δ-valerolactone and γ-butyrolactam; acid imide compounds such as succinimide and maleimide; imidazole compounds such as imidazole and 2-methylimidazole; urea compounds such as urea, thiourea and ethyleneurea; oxime compounds such as formamide oxime, acetaldoxime, acetoxime, methyl ethyl ketone oxime and cyclohexanone oxime; amine compounds such as diphenylamine, aniline, carbazole, di-n-propylamine, diisopropylamine and isopropylethylamine; imine compounds such as ethyleneimine and polyethyleneimine; and pyrazole compounds such as pyrazole, 3-methylpyrazole and 3,5-dimethylpyrazole.

Of these, active ethylene, oxime, and pyrazole-type compounds are preferred, with acetyl acetone, diethyl malonate, methyl ethyl ketone oxime, cyclohexanone oxime, 3-methylpyrazole and 3,5-dimethylpyrazole being especially preferred.

Reaction of the polyisocyanate with the blocking agent can be carried out by a known method. Moreover, it may be carried out regardless of the presence of absence of a solvent. When a solvent is used, the solvent must be one that is inert to isocyanate groups. An organometallic salt or metal alcoholate, such as of tin, zinc or lead, and a tertiary amine or the like may be used as a catalyst during the blocking reaction. The blocking reaction can generally be carried out at between −20 and 150° C., and preferably between 0 and 100° C. At above 150° C., side reactions may arise. On the other hand, when the temperature is too low, the reaction rate becomes slow, which is disadvantageous. In this blocked polyisocyanate, at least 50 mol % of the isocyanate groups should be blocked with the above heat-labile blocking agent, although it is preferable for at least 75 mol % of the isocyanate groups, and most preferable for at least 90 mol % of the isocyanate groups, to be blocked with the heat-labile blocking agent.

The silicone composition of the invention includes 70 to 98 parts by weight of organopolysiloxane (A) or (A'), and 2 to 30 parts by weight of blocked polyisocyanate (B). The composition preferably includes 80 to 95 parts by weight of organopolysiloxane, and 5 to 20 parts by weight of blocked polyisocyanate (B). When there is too much component (A) or (A') and too little component (B), the curability is low and the wash durability of the composition when used as a textile treatment is inadequate. On the other hand, when there is too little component (A) or (A') and too much component (B), the shelf stability is inadequate.

The silicone composition of the invention may optionally include various types of solvents. Examples of the solvent include acetone, methyl ethyl ketone, methyl isobutyl ketone, ethyl acetate, n-butyl acetate, cellosolve acetate, butanol, isopropyl alcohol, toluene and dipropylene glycol monomethyl ether. These solvents may be used singly or two or more may be used together. The amount of solvent is preferably from 0 to 50 wt % of the silicone composition. The silicone composition of the invention can be preparing by uniformly mixing together above component (A) or (A'), component (B) and, optionally, any of various solvents.

The reaction product is preferably one in which at least one NH group included in the organopolysiloxane of component (A) or (A') has reacted with an isocyanate group on component (B). The reaction method is not particularly limited, and reaction may be carried out according to a method known to the art, such as by heating during mixture. The temperature during the reaction, although not particularly limited, is preferably from 0 to 200° C., and more preferably from 50 to 150° C. The reaction time is not particularly limited, and is suitably adjusted according to the reaction temperature, although the reaction time is preferably from 30 minutes to 8 hours, and more preferably from 30 minutes to 5 hours.

[Silicone Emulsion Composition]

The silicone composition of the invention can be emulsified with a nonionic, anionic or cationic surfactant to form a silicone emulsion composition containing the silicone composition. The content of silicone composition in the silicone emulsion composition is preferably from 10 to 50 wt %, and more preferably from 20 to 40 wt. The emulsifying method is subsequently described.

[Textile Treatment]

The silicone composition of the invention is a curable silicone composition which has an excellent low-temperature curability, can impart a good softness to various types of textile fibers and products, and moreover has an excellent durability to washing. The silicone composition of the invention is thus useful as a textile treatment. The silicone composition content within the textile treatment is preferably from 0.01 to 50 wt %, and more preferably from 0.1 to 40 wt %. When treating textile fibers, the textile treatment may be diluted and used, in which case the content of silicone composition within the textile treatment dilution used to treat textile fibers is preferably from 0.01 to 5 wt %, and more preferably from 0.1 to 0.5 wt %.

The textile treatment of the invention is effective on natural fibers such as cotton, silk, linen, wool, angora and mohair, on synthetic fibers such as polyester, nylon, acrylics and spandex, and also on all textile products made with such fibers. Nor are there any limitations on the form and shape of such textile fibers and products, the inventive textile treatment composition being suitable for use not only on raw materials such as staple fiber, filament, tow and yarn, but also on various processed forms such as knit fabric, woven fabric, batting, nonwovens, paper, sheet and film.

When using the inventive composition as a textile treatment, it is either dissolved in an organic solvent such as toluene, xylene, n-hexane, n-heptane, methyl ethyl ketone, methyl isobutyl ketone, ethyl acetate, butyl acetate or mineral turpentine and employed in this manner to treat textile fibers and products, or it is emulsified using a nonionic, anionic or cationic surfactant and employed in this manner to treat textile fibers and products. Such emulsifying agents are not particularly limited, and may be selected from among nonionic emulsifying agents such as polyoxyethylene alkyl ethers, polyoxyethylene alkyl phenyl ethers, sorbitol alkylates and polyoxyethylene sorbitol alkylates; anionic emulsifying agents such as alkylbenzene sulfonates and alkyl phosphates; cationic emulsifying agents such as quaternary ammonium salts and alkylamine salts; and amphoteric emulsifying agents such as alkyl betaines and alkyl imidazolines. These emulsifying agents are used in an amount, per 100 parts by weight of the organopolysiloxane (A), of preferably 5 to 50 parts by weight, and more preferably 10 to 30 parts by weight. Water may be used in any amount during emulsification, although use is typically made of an amount such as to set the concentration of organopolysiloxane, expressed in terms of the pure compound, to generally 5 to 60 wt %, and preferably 10 to 40 wt %.

An emulsion of the textile treatment may be formed by mixing together the organopolysiloxane of the invention and a surfactant, then using an emulsifier such as a homogenizing mixer, homogenizer, colloid mill or line mixer to carry out emulsification.

The method of treatment involves the preparation of a solution or emulsion of the silicone composition in an organic solvent to the desired concentration, followed by application to the fibers by such means as dipping, spraying or roll coating. The pickup differs with the type of fiber and is not particularly limited, but is generally set to an amount, expressed in terms of the pure organopolysiloxane with respect to the fabric, in the range of 0.01 to 10 wt %. The fabric is then dried by hot air blowing, heat treatment or the like. Although the conditions vary with the type of fiber, when treatment by dipping is carried out, the dipping time may be set to 1 to 5 minutes, and the drying temperature and time may be set in the respective ranges of 100 to 200° C. and 1 to 15 minutes.

In addition to textile treatment applications, the silicone composition of the invention may also be used in various other applications such as coatings, adhesives, sealants and inks, and in impregnating agents and surface treatments for paper and the like. Where necessary, additives may be used at this time. Exemplary additives include textile finishes such as anti-creasing agents, flame retardants, antistatic agents and heat stabilizers; and also antioxidants, ultraviolet absorbers, pigments, metal flake pigments, rheology control agents, curing accelerators, deodorants and antimicrobial agents. These additives may be used singly or two or more may be suitably used in combination.

EXAMPLES

Examples of the invention and Comparative Examples are given below by way of illustration and not by way of limitation. In these Examples, unless noted otherwise, all references to percent (%) and parts in the formulations are by weight.

The measurement methods in the following Examples are described below.

The average molecular weights are polystyrene-equivalent number-average molecular weights measured by gel permeation chromatography (GPC) using the following apparatus.

| | |
|---|---|
| Instrument: | HLC-802A, from Tosoh Corporation |
| Columns: (from Tosoh Corporation) | |
| | G1000HXL column (1) |
| | G2000HXL column (1) |
| | G3000HXL column (1) |
| Carrier: | Tetrahydrofuran |
| Method of detection: | Differential refractometer |

The viscosities were values measured at 25° C. using a Brookfield (BM-type) viscometer (from Tokyo Keiki, Inc.). $^1$H-NMR measurements were taken in heavy chloroform using a 400 MHz FT-NMR spectrometer (JEOL Ltd.).

Synthesis Example 1

The interior of a separable flask fitted with a stirrer, a thermometer, a reflux condenser, a nitrogen inlet and a dropping funnel was placed under a nitrogen atmosphere, charged with 600 parts of hexamethylene diisocyanate, and the temperature within the reactor was held at 70° C. under stirring. Tetramethylammonium caprate as an isocyanurate-forming catalyst was added and, when the rate of conversion reached 40%, the reaction was stopped by adding phosphoric acid. The reaction mixture was filtered, following which unreacted hexamethylene diisocyanate was removed using a thin-film evaporator. The resulting polyisocyanate had a viscosity at 25° C. of 2,500 mPa·s and a number-average molecular weight of 680.

The rate of conversion for isocyanurate formation was obtained by determining the area of the peak at the molecular weight corresponding to the isocyanurate as a proportion of the sum of the area of the peak at the molecular weight corresponding to the unreacted hexamethylene diisocyanate and the area of the peak at the molecular weight corresponding to the isocyanurate.

Synthesis Example 2

A reactor like that in Synthesis Example 1 was charged with 100 parts of the isocyanurate obtained in Synthesis Example 1, 13 parts of polypropylene diol, and butyl acetate as the solvent in an amount such that the final blocked polyisocyanate ingredient concentration becomes 90%, and the system was held under a nitrogen atmosphere for 3 hours at 70° C. Next, 50 parts of 3,5-dimethylpyrazole was added, and the characteristic absorption of isocyanate groups in the infrared spectrum was confirmed to have vanished. The resulting blocked polyisocyanate had an average molecular weight of 1,200. At least 50% of the isocyanate groups were blocked with heat-labile blocking agent.

Synthesis Example 3

A reactor like that in Synthesis Example 1 was charged with 100 parts of the isocyanurate obtained in Synthesis Example 1, 13 parts of polypropylene diol, and butyl acetate as the solvent in an amount such that the final blocked polyisocyanate ingredient concentration becomes 90%, and the system was held under a nitrogen atmosphere for 3 hours at 70° C. Next, 45 parts of methyl ethyl ketone oxime was added, and the characteristic absorption of isocyanate groups in the infrared spectrum was confirmed to have vanished. The resulting blocked polyisocyanate had an average molecular weight of 1,100.

Synthesis Example 4

A reactor like that in Synthesis Example 1 was charged with 100 parts of the isocyanurate obtained in Synthesis Example 1, 13 parts of polypropylene diol, and butyl acetate as the solvent in an amount such that the final blocked polyisocyanate ingredient concentration becomes 90%, and the system was held under a nitrogen atmosphere for 3 hours at 70° C. Next, 83 parts of diethyl malonate was added, and the characteristic absorption of isocyanate groups in the infrared spectrum was confirmed to have vanished. The resulting blocked polyisocyanate had an average molecular weight of 1,280.

Synthesis Example 5

A separable flask equipped with a thermometer, a stirrer, a reflux condenser and a nitrogen gas inlet was charged with 100 g of the aminoalkyl group-containing organopolysiloxane of formula (A) below (molecular weight, 4,066; amine equivalent weight, 1,010 g/mol), the polyethylene glycol monobutyl monoglycidyl ether of formula (B) below (molecular weight, 349) in an amount of 52 g (this being an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 1.0), and 7.4 g of isopropyl alcohol. Nitrogen gas was introduced into the system, after which the system was tightly sealed and an addition reaction was carried out for 4 hours at 80° C. Following reaction completion, removal of the low-boiling fraction was carried out for 1 hour at 80° C. and under a reduced pressure of 10 mmHg, yielding 145 g of the oily compound shown in formula (C) below. The compound had an appearance that was light-yellow and translucent, a viscosity of 490 mPa·s, and an amine equivalent weight of 2,940 g/mol. Upon $^1$H-NMR measurement of the compound, the ratio between methylene groups directly bonded to silicon atoms on the organopolysiloxane and terminal methyl groups on butyl groups of polyethylene glycol monobutyl monoglycidyl ether molecules that reacted with nitrogen atoms on the aminoalkyl group-containing organopolysiloxane was found to be 1:3.01, confirming that all the nitrogen atoms on the aminoalkyl group-containing organopolysiloxane had reacted with glycidyl groups on polyethylene glycol monobutyl monoglycidyl ether molecules. Unreacted glycidyl groups were not detected.

[Chemical Formula 26]

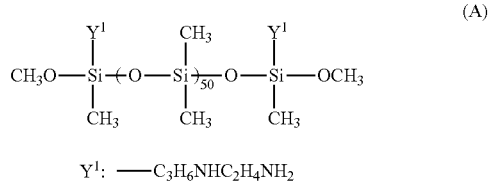

-continued

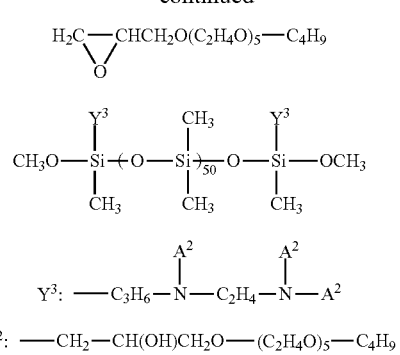

(B) $H_2C\text{—}CHCH_2O(C_2H_4O)_5\text{—}C_4H_9$ (C)
$$CH_3O\text{—}\underset{\underset{CH_3}{|}}{\overset{\overset{Y^3}{|}}{Si}}\text{—}(O\text{—}\underset{\underset{CH_3}{|}}{\overset{\overset{CH_3}{|}}{Si}})_{50}\text{—}O\text{—}\underset{\underset{CH_3}{|}}{\overset{\overset{Y^3}{|}}{Si}}\text{—}OCH_3$$

$Y^3:\ \text{—}C_3H_6\text{—}\underset{\underset{A^2}{|}}{N}\text{—}C_2H_4\text{—}\underset{\underset{A^2}{|}}{N}\text{—}A^2$ $A^2:\ \text{—}CH_2\text{—}CH(OH)CH_2O\text{—}(C_2H_4O)_5\text{—}C_4H_9$ Synthesis Example 6 (For Comparison)

A separable flask equipped with a thermometer, a stirrer, a reflux condenser and a nitrogen gas inlet was charged with 100 g of the aminoalkyl group-containing organopolysiloxane of formula (A) above, the polyethylene glycol monobutyl monoglycidyl ether of formula (B) above in an amount of 42 g (this being an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 0.8), and 6.8 g of isopropyl alcohol. Nitrogen gas was introduced into the system, after which the system was tightly sealed and an addition reaction was carried out for 4 hours at 80° C. Following reaction completion, removal of the low-boiling fraction was carried out for 1 hour at 80° C. and under a reduced pressure of 10 mmHg, yielding 130 g of an oily compound. The compound had an appearance that was light-yellow and translucent, a viscosity of 400 mPa·s, and an amine equivalent weight of 1,560 g/mol. Upon $^1$H-NMR measurement of the compound, the ratio between methylene groups directly bonded to silicon atoms on the organopolysiloxane and terminal methyl groups on the butyl groups of polyethylene glycol monobutyl monoglycidyl ether molecules that reacted with nitrogen atoms on the aminoalkyl group-containing organopolysiloxane was found to be 1:2.37, confirming that 79% of the nitrogen atoms on the aminoalkyl group-containing organopolysiloxane had reacted with glycidyl groups on polyethylene glycol monobutyl monoglycidyl ether molecules.

Synthesis Example 7

A separable flask equipped with a thermometer, a stirrer, a reflux condenser and a nitrogen gas inlet was charged with 100 g of the aminoalkyl group-containing organopolysiloxane of formula (D) below (molecular weight, 7,682; amine equivalent weight, 1,920 g/mol), the polyethylene glycol monobutyl monoglycidyl ether of formula (B) above (molecular weight, 349) in an amount of 27 g (this being an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 1.0), and 6.1 g of isopropyl alcohol. Nitrogen gas was introduced into the system, after which the system was tightly sealed and an addition reaction was carried out for 4 hours at 80° C. Following reaction completion, removal of the low-boiling fraction was carried out for 1 hour at 80° C. and under a reduced pressure of 10 mmHg, yielding 119 g of the oily compound shown in formula (E) below. The compound had an appearance that was light-yellow and translucent, a viscosity of 900 mPa·s, and an amine equivalent weight of 4,920 g/mol. Upon $^1$H-NMR measurement of the compound, the ratio between methylene groups directly bonded to silicon atoms on the organopolysiloxane and terminal methyl groups on the butyl groups of polyethylene glycol monobutyl monoglycidyl ether molecules that reacted with nitrogen atoms on the aminoalkyl group-containing organopolysiloxane was found to be 1:2.98. Unreacted glycidyl groups were not detected. The proportion of the total number of groups of general formula $R^z$ accounted for by —$CH_2$—$CH(OH)CH_2O$—$(C_2H_4O)_b$—$(C_3H_6O)_c$—Z groups was 99%.

[Chemical Formula 27]

(D)
$$H_3C\text{—}\underset{\underset{CH_3}{|}}{\overset{\overset{CH_3}{|}}{Si}}\text{—}(O\text{—}\underset{\underset{CH_3}{|}}{\overset{\overset{CH_3}{|}}{Si}})_{100}\text{—}(O\text{—}\underset{\underset{CH_3}{|}}{\overset{\overset{Y^1}{|}}{Si}})_2\text{—}O\text{—}\underset{\underset{CH_3}{|}}{\overset{\overset{CH_3}{|}}{Si}}\text{—}CH_3$$

$Y^1:\ \text{—}C_3H_6NHC_2H_4NH_2$ (E)
$$H_3C\text{—}\underset{\underset{CH_3}{|}}{\overset{\overset{CH_3}{|}}{Si}}\text{—}(O\text{—}\underset{\underset{CH_3}{|}}{\overset{\overset{CH_3}{|}}{Si}})_{100}\text{—}(O\text{—}\underset{\underset{CH_3}{|}}{\overset{\overset{Y^3}{|}}{Si}})_2\text{—}O\text{—}\underset{\underset{CH_3}{|}}{\overset{\overset{CH_3}{|}}{Si}}\text{—}CH_3$$

$Y^3:\ \text{—}C_3H_6\text{—}\underset{\underset{A^2}{|}}{N}\text{—}C_2H_4\text{—}\underset{\underset{A^2}{|}}{N}\text{—}A^2$ $A^2:\ \text{—}CH_2\text{—}CH(OH)CH_2O\text{—}(C_2H_4O)_5\text{—}C_4H_9$ Synthesis Example 8

A separable flask equipped with a thermometer, a stirrer, a reflux condenser and a nitrogen gas inlet was charged with 100 g of the aminoalkyl group-containing organopolysiloxane of formula (F) below (molecular weight, 3,848; amine equivalent weight, 1,930 g/mol), the polyethylene glycol monobutyl monoglycidyl ether of formula (B) above (molecular weight, 349) in an amount of 36 g (this being an amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 1.0), and 6.5 g of isopropyl alcohol. Nitrogen gas was introduced into the system, after which the system was tightly sealed and an addition reaction was carried out for 4 hours at 80° C. Following reaction completion, removal of the low-boiling fraction was carried out for 1 hour at 80° C. and under a reduced pressure of 10 mmHg, yielding 131 g of the oily compound shown in formula (G) below. The compound had an appearance that was light-yellow and translucent, a viscosity of 450 mPa·s, and an amine equivalent weight of 2,650 g/mol. Upon $^1$H-NMR measurement of the compound, the ratio between methylene groups directly bonded to silicon atoms on the organopolysiloxane and terminal methyl groups on the butyl groups of polyethylene glycol monobutyl monoglycidyl ether molecules that reacted with nitrogen atoms on the aminoalkyl group-containing organopolysiloxane was found to be 1:2.98. Unreacted glycidyl groups were not detected. The proportion of the total number of groups of general formula $R^z$ accounted is for by —$CH_2$—$CH(OH)CH_2O$—$(C_2H_4O)_b$—$(C_3H_6O)_c$—Z groups was 99%.

[Chemical Formula 28]

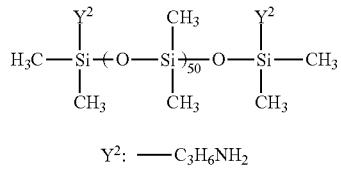
(F)

$Y^2$: —$C_3H_6NH_2$

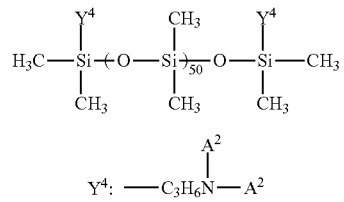
(G)

$Y^4$: —$C_3H_6N$—$A^2$ $A^2$: —$CH_2$—$CH(OH)CH_2O$—$(C_2H_4O)_5$—$C_4H_9$

Example 1

A separable flask equipped with a thermometer, a stirrer, a reflux condenser and a nitrogen gas inlet was charged with 95.0 parts of the organopolysiloxane of formula (H) below (molecular weight, 4,066; amine equivalent weight, 1,010 g/mol) and 5.0 parts of the blocked polyisocyanate obtained in Synthesis Example 2, following which the flask contents were stirred for 2 hours at 100° C. under a nitrogen atmosphere, thereby giving a silicone composition.

[Chemical Formula 29]

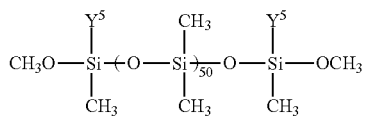
(H)

$Y^5$: —$C_3H_6NHC_2H_4NH_2$

Example 2

Aside from changing the organopolysiloxane of formula (H) above to the organopolysiloxane of formula (I) below, a silicone composition was prepared in the same way as in Example 1.

[Chemical Formula 30]

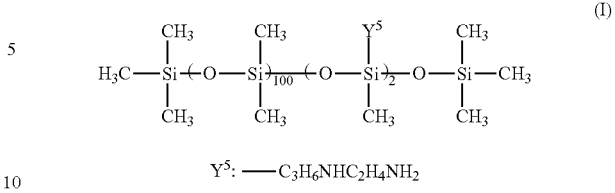
(I)

$Y^5$: —$C_3H_6NHC_2H_4NH_2$

Example 3

Aside from changing the organopolysiloxane of formula (H) above to the organopolysiloxane of formula (J) below, a silicone composition was prepared in the same way as in Example 1.

[Chemical Formula 31]

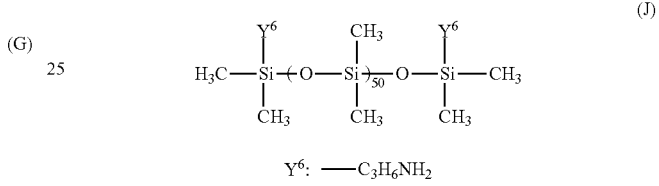
(J)

$Y^6$: —$C_3H_6NH_2$

Example 4

Aside from changing the blocked polyisocyanate obtained in Synthesis Example 2 to the blocked polyisocyanate obtained in Synthesis Example 3, a silicone composition was prepared in the same way as in Example 1.

Example 5

Aside from changing the blocked polyisocyanate obtained in Synthesis Example 2 to the blocked polyisocyanate obtained in Synthesis Example 4, a silicone composition was prepared in the same way as in Example 1.

Example 6

A silicone composition was obtained by stirring the following for 30 minutes at 25° C.: 95.0 parts of the organopolysiloxane of formula (H) above (molecular weight, 4,066; amine equivalent weight, 1,010 g/mol), and 5.0 parts of the blocked polyisocyanate obtained in Synthesis Example 2.

Example 7

Aside from changing the charged amount of the organopolysiloxane of formula (H) to 90.0 parts and the charged amount of the blocked polyisocyanate obtained in Synthesis Example 2 to 10.0 parts, a silicone composition was prepared in the same way as in Example 1.

Example 8

Aside from changing the charged amount of the organopolysiloxane of formula (H) to 97.0 parts and the charged amount of the blocked polyisocyanate obtained in Synthesis Example 2 to 3.0 parts, a silicone composition was prepared in the same way as in Example 1.

Comparative Example 1

Aside from changing the charged amount of the organopolysiloxane of formula (H) to 99.0 parts and the charged amount of the blocked polyisocyanate obtained in Synthesis Example 2 to 1.0 part, a silicone composition was prepared in the same way as in Example 1.

Comparative Example 2

Aside from changing the organopolysiloxane of formula (H) to the organopolysiloxane of above formula (I), a silicone composition was formulated and prepared in the same way as in Comparative Example 1.

Comparative Example 3

Aside from changing the organopolysiloxane of formula (H) to the organopolysiloxane of above formula (J), a silicone composition was formulated and prepared in the same way as in Comparative Example 1.

Comparative Example 4

Aside from changing the blocked polyisocyanate obtained in Synthesis Example 2 to the blocked polyisocyanate obtained in Synthesis Example 3, a silicone composition was formulated and prepared in the same way as in Comparative Example 1.

Comparative Example 5

Aside from changing the blocked polyisocyanate obtained in Synthesis Example 2 to the blocked polyisocyanate obtained in Synthesis Example 4, a silicone composition was formulated and prepared in the same way as in Comparative Example 1.

[Evaluation Tests]

1. Curability

Two grams of the silicone composition was weighed into an aluminum laboratory dish having a 6 cm diameter, and heated at 120° C. for 15 minutes. Compositions that cured completely were given a rating of "A"; compositions that only partially cured were given a rating of "B"; compositions that remained entirely uncured were given a rating of "C". The results are shown in Table 1.

2. Shelf Stability

Five grams of the silicone composition was placed in a 25 mL glass bottle and left to stand for one day at 25° C., following which the appearance was examined. Compositions having a good appearance were rated as "Good"; compositions that had thickened or gelled were rated as "NG". The results are shown in Table 1.

TABLE 1

| | (A) | (B) | Heating conditions | Curability | Shelf stability |
|---|---|---|---|---|---|
| Example 1 | (H): 95.0 parts | Synthesis Example 2: 5.0 parts | 100° C., 2 hours | A | good |
| Example 2 | (I): 95.0 parts | Synthesis Example 2: 5.0 parts | 100° C., 2 hours | A | good |
| Example 3 | (J): 95.0 parts | Synthesis Example 2: 5.0 parts | 100° C., 2 hours | A | good |
| Example 4 | (H): 95.0 parts | Synthesis Example 3: 5.0 parts | 100° C., 2 hours | A | good |
| Example 5 | (H): 95.0 parts | Synthesis Example 4: 5.0 parts | 100° C., 2 hours | A | good |
| Example 6 | (H): 95.0 parts | Synthesis Example 2: 5.0 parts | 25° C., 30 min. | A | good |
| Example 7 | (H): 90.0 parts | Synthesis Example 2: 10.0 parts | 100° C., 2 hours | A | good |
| Example 8 | (H): 97.0 parts | Synthesis Example 2: 3.0 parts | 100° C., 2 hours | A | good |
| Comparative Example 1 | (H): 99.0 parts | Synthesis Example 2: 1.0 part | 100° C., 2 hours | B | good |
| Comparative Example 2 | (I): 99.0 parts | Synthesis Example 2: 1.0 part | 100° C., 2 hours | B | good |
| Comparative Example 3 | (J): 99.0 parts | Synthesis Example 2: 1.0 part | 100° C., 2 hours | B | good |
| Comparative Example 4 | (H): 99.0 parts | Synthesis Example 3: 1.0 part | 100° C., 2 hours | C | good |
| Comparative Example 5 | (H): 99.0 parts | Synthesis Example 4: 1.0 part | 100° C., 2 hours | C | good |

Example 9

Using a homogenizing mixer, 60 g of the silicone composition obtained in Example 1 and 10 g of polyoxyethylene alkyl ether (Emulgen 1108, from Kao Corporation) were mixed together for 20 minutes at 2,000 rpm, and emulsified and dispersed in 20 g of water. The dispersion was then diluted with 110 g of water, giving an emulsion composition.

Example 10

Aside from replacing the silicone composition obtained in Example 1 with the silicone composition obtained in Example 2, an emulsion composition was formulated and prepared in the same way as in Example 9.

Example 11

Aside from replacing the silicone composition obtained in Example 1 with the silicone composition obtained in Example 3, an emulsion composition was formulated and prepared in the same way as in Example 9.

Example 12

Aside from replacing the silicone composition obtained in Example 1 with the silicone composition obtained in Example 4, an emulsion composition was formulated and prepared in the same way as in Example 9.

Example 13

Aside from replacing the silicone composition obtained in Example 1 with the silicone composition obtained in Example 5, an emulsion composition was formulated and prepared in the same way as in Example 9.

Example 14

Aside from replacing the silicone composition obtained in Example 1 with the silicone composition obtained in Example 6, an emulsion composition was formulated and prepared in the same way as in Example 9.

Example 15

Aside from replacing the silicone composition obtained in Example 1 with the silicone composition obtained in Example 7, an emulsion composition was formulated and prepared in the same way as in Example 9.

Example 16

Aside from replacing the silicone composition obtained in Example 1 with the silicone composition obtained in Example 8, an emulsion composition was formulated and prepared in the same way as in Example 9.

Comparative Example 6

Aside from replacing the silicone composition obtained in Example 1 with the silicone composition obtained in Comparative Example 1, an emulsion composition was formulated and prepared in the same way as in Example 9.

Comparative Example 7

Aside from replacing the silicone composition obtained in Example 1 with the silicone composition obtained in Comparative Example 2, an emulsion composition was formulated and prepared in the same way as in Example 9.

Comparative Example 8

Aside from replacing the silicone composition obtained in Example 1 with the silicone composition obtained in Comparative Example 3, an emulsion composition was formulated and prepared in the same way as in Example 9.

Comparative Example 9

Aside from replacing the silicone composition obtained in Example 1 with the silicone composition obtained in Comparative Example 4, an emulsion composition was formulated and prepared in the same way as in Example 9.

Comparative Example 10

Aside from replacing the silicone composition obtained in Example 1 with the silicone composition obtained in Comparative Example 5, an emulsion composition was formulated and prepared in the same way as in Example 9.

Comparative Example 11

Aside from replacing the silicone composition obtained in Example 1 with the organopolysiloxane of formula (H) above, an emulsion composition was formulated and prepared in the same way as in Example 9.

[Evaluation Tests]

The following evaluation tests were carried out on each of the emulsion compositions. The results are shown in Table 2.

3. Softness

A test liquid was prepared by adding deionized water to the emulsion composition and diluting to a solids concentration of 0.5 wt %. A polyester/cotton broadcloth (65%/35%, from Tanigashira Shoten) was dipped for 1 minute in the test liquid, after which the cloth was squeezed using rolls at a squeezing ratio of 100%, dried for 2 minutes at 100° C., and then additionally heat-treated for 2 minutes at 150° C., thereby producing a treated cloth for softness evaluation. A panel of three judges tested the treated cloth by touching it with their hands and rated the softness according to the following criteria.

<Evaluation Criteria>
A: Very pleasant to the touch
B: Pleasant to the touch
C: Unpleasant to the touch 4. Wash Durability A test liquid was prepared by adding deionized water to the emulsion composition and diluting to a solids concentration of 2 wt %. A polyester/cotton broadcloth (65%/35%, from Tanigashira Shoten) was dipped for 10 seconds in the test liquid, after which the cloth was squeezed using rolls at a squeezing ratio of 100% and dried for 2 minutes at 130° C. The treated cloth was then washed a single time with a washing machine by a procedure in accordance with JIS L0217 103. The amount of silicone remaining on the fiber surfaces after a single wash was measured with a fluorescence x-ray spectrometer (Rigaku Corporation) and calculated as the remaining ratio (%) compared with when washing was not carried out.

TABLE 2

|  | Silicone composition | Softness | Wash durability (%) |
| --- | --- | --- | --- |
| Example 9 | Example 1 | A | 82 |
| Example 10 | Example 2 | A | 78 |
| Example 11 | Example 3 | A | 79 |
| Example 12 | Example 4 | A | 75 |
| Example 13 | Example 5 | A | 76 |
| Example 14 | Example 6 | A | 54 |
| Example 15 | Example 7 | A | 85 |
| Example 16 | Example 8 | A | 70 |
| Comparative Example 6 | Comparative Example 1 | A | 15 |
| Comparative Example 7 | Comparative Example 2 | A | 17 |
| Comparative Example 8 | Comparative Example 3 | A | 14 |
| Comparative Example 9 | Comparative Example 4 | A | 11 |
| Comparative Example 10 | Comparative Example 5 | A | 14 |
| Comparative Example 11 | Organopolysiloxane of formula (H) | B | 5 |

As shown in Table 1, the silicone compositions of the invention have an excellent low-temperature curability and shelf stability. Also, as shown in Table 2, textile treatments using the silicone compositions of the invention are able to impart good softness to textiles, and also have an excellent wash durability.

Example 17

A separable flask equipped with a thermometer, a stirrer, a reflux condenser and a nitrogen gas inlet was charged with 87.5 parts of the organopolysiloxane obtained in Synthesis Example 5 and 12.5 parts of the blocked polyisocyanate obtained in Synthesis Example 2, following which the flask contents were stirred for 4 hours at 120° C. under a nitrogen atmosphere, thereby giving a silicone composition.

Example 18

Aside from replacing the organopolysiloxane obtained in Synthesis Example 1 with the organopolysiloxane obtained in Synthesis Example 7, a silicone composition was prepared in the same way as in Example 17.

Example 19

Aside from replacing the organopolysiloxane obtained in Synthesis Example 5 with the organopolysiloxane obtained in Synthesis Example 8, a silicone composition was prepared in the same way as in Example 17.

Example 20

Aside from changing the charged amount of the organopolysiloxane obtained in Synthesis Example 5 to 85.0 parts and the charged amount of the blocked polyisocyanate obtained in Synthesis Example 2 to 15.0 parts, a silicone composition was prepared in the same way as in Example 17.

Example 21

Aside from changing the charged amount of the organopolysiloxane obtained in Synthesis Example 5 to 92.5 parts and the charged amount of the blocked polyisocyanate obtained in Synthesis Example 2 to 7.5 parts, a silicone composition was prepared in the same way as in Example 17.

Example 22

Aside from replacing the blocked isocyanate obtained in Synthesis Example 2 with the blocked isocyanate obtained in Synthesis Example 3, a silicone composition was prepared in the same way as in Example 17.

Example 23

Aside from replacing the blocked isocyanate obtained in Synthesis Example 2 with the blocked isocyanate obtained in Synthesis Example 4, a silicone composition was prepared in the same way as in Example 17.

Example 24

A separable flask equipped with a thermometer, a stirrer, a reflux condenser and a nitrogen gas inlet was charged with 80.0 parts of the organopolysiloxane obtained in Synthesis Example 5, 7.5 parts of the organopolysiloxane of formula (A) above and 12.5 parts of the blocked polyisocyanate obtained in Synthesis Example 2, following which the flask contents were stirred for 4 hours at 120° C. under a nitrogen atmosphere, thereby giving a silicone composition.

Example 25

A silicone composition was prepared by stirring the following for 30 minutes at 25° C. and under a nitrogen atmosphere: 87.5 parts of the organopolysiloxane obtained in Synthesis Example 5 and 12.5 parts of the blocked polyisocyanate obtained in Synthesis Example 2.

Comparative Example 12

Aside from changing the charged amount of organopolysiloxane obtained in Synthesis Example 5 to 99.0 parts and the charged amount of blocked isocyanate obtained in Synthesis Example 2 to 1.0 part, a silicone composition was prepared in the same way as in Example 17.

Comparative Example 13

Aside from changing the blocked isocyanate obtained in Synthesis Example 2 to the blocked isocyanate obtained in Synthesis Example 3, a silicone composition was formulated and prepared in the same way as in Comparative Example 12.

Comparative Example 14

Aside from changing the blocked isocyanate obtained in Synthesis Example 2 to the blocked isocyanate obtained in Synthesis Example 4, a silicone composition was formulated and prepared in the same way as in Comparative Example 12.

Comparative Example 15

Aside from changing the organopolysiloxane obtained in Synthesis Example 5 to the organopolysiloxane obtained in Synthesis Example 6, a silicone composition was formulated and prepared in the same way as in Example 17.

[Evaluation Tests]
1. Curability

Two grams of the silicone composition was weighed into an aluminum laboratory dish having a 6 cm diameter, and heated at 150° C. for 15 minutes. Compositions that cured completely were given a rating of "A"; compositions that only partially cured were given a rating of "B"; compositions that remained entirely uncured were given a rating of "C". The results are shown in Table 3.

2. Shelf Stability

Five grams of the silicone composition was placed in a 25 mL glass bottle and left to stand for one day at 40° C., following which the appearance was examined. Compositions having a good appearance were rated as "Good"; compositions that had thickened or gelled were rated as "NG". The results are shown in Table 3.

TABLE 3

|  | (A) | (B) | Heating conditions | Curability | Shelf stability |
|---|---|---|---|---|---|
| Example 17 | Synthesis Example 5: 87.5 parts | Synthesis Example 2: 12.5 parts | 120° C., 4 hours | A | good |
| Example 18 | Synthesis Example 7: 87.5 parts | Synthesis Example 2: 12.5 parts | 120° C., 4 hours | A | good |
| Example 19 | Synthesis Example 8: 87.5 parts | Synthesis Example 2: 12.5 parts | 120° C., 4 hours | A | good |
| Example 20 | Synthesis Example 5: 85.0 parts | Synthesis Example 2: 15.0 parts | 120° C., 4 hours | A | good |

TABLE 3-continued

| | (A) | (B) | Heating conditions | Cura-bility | Shelf stability |
|---|---|---|---|---|---|
| Example 21 | Synthesis Example 5: 92.5 parts | Synthesis Example 2: 7.5 parts | 120° C., 4 hours | A | good |
| Example 22 | Synthesis Example 5: 87.5 parts | Synthesis Example 3: 12.5 parts | 120° C., 4 hours | A | good |
| Example 23 | Synthesis Example 5: 87.5 parts | Synthesis Example 4: 12.5 parts | 120° C., 4 hours | A | good |
| Example 24 | Synthesis Example 5: 80.0 parts Formula (A): 7.5 parts | Synthesis Example 2: 12.5 parts | 120° C., 4 hours | A | good |
| Example 25 | Synthesis Example 5: 87.5 parts | Synthesis Example 2: 12.5 parts | 25° C., 30 min. | A | good |
| Comparative Example 12 | Synthesis Example 5: 99.0 parts | Synthesis Example 2: 1.0 part | 120° C., 4 hours | B | good |
| Comparative Example 13 | Synthesis Example 5: 99.0 parts | Synthesis Example 3: 1.0 part | 120° C., 4 hours | C | good |
| Comparative Example 14 | Synthesis Example 5: 99.0 parts | Synthesis Example 4: 1.0 part | 120° C., 4 hours | C | good |
| Comparative Example 15 | Synthesis Example 6: 87.5 parts | Synthesis Example 2: 12.5 part | 120° C., 4 hours | A | NG |

Example 26

Using a homogenizing mixer, 60 g of the silicone composition obtained in Example 17 and 10 g of polyoxyethylene alkyl ether (Emulgen 1108, from Kao Corporation) were mixed together for 20 minutes at 2,000 rpm, and emulsified and dispersed in 20 g of water. The dispersion was then diluted with 110 g of water, giving an emulsion composition.

Example 27

Aside from replacing the silicone composition obtained in Example 17 with the silicone composition obtained in Example 18, an emulsion composition was formulated and prepared in the same way as in Example 26.

Example 28

Aside from replacing the silicone composition obtained in Example 17 with the silicone composition obtained in Example 19, an emulsion composition was formulated and prepared in the same way as in Example 26.

Example 29

Aside from replacing the silicone composition obtained in Example 17 with the silicone composition obtained in Example 20, an emulsion composition was formulated and prepared in the same way as in Example 26.

Example 30

Aside from replacing the silicone composition obtained in Example 17 with the silicone composition obtained in Example 21, an emulsion composition was formulated and prepared in the same way as in Example 26.

Example 31

Aside from replacing the silicone composition obtained in Example 17 with the silicone composition obtained in Example 22, an emulsion composition was formulated and prepared in the same way as in Example 26.

Example 32

Aside from replacing the silicone composition obtained in Example 17 with the silicone composition obtained in Example 23, an emulsion composition was formulated and prepared in the same way as in Example 26.

Example 33

Aside from replacing the silicone composition obtained in Example 17 with the silicone composition obtained in Example 24, an emulsion composition was formulated and prepared in the same way as in Example 26.

Example 34

Aside from replacing the silicone composition obtained in Example 17 with the silicone composition obtained in Example 25, an emulsion composition was formulated and prepared in the same way as in Example 26.

Comparative Example 16

Aside from replacing the silicone composition obtained in Example 17 with the silicone composition obtained in Comparative Example 12, an emulsion composition was formulated and prepared in the same way as in Example 26.

Comparative Example 17

Aside from replacing the silicone composition obtained in Example 17 with the silicone composition obtained in Comparative Example 13, an emulsion composition was formulated and prepared in the same way as in Example 26.

Comparative Example 18

Aside from replacing the silicone composition obtained in Example 17 with the silicone composition obtained in Comparative Example 14, an emulsion composition was formulated and prepared in the same way as in Example 26.

Comparative Example 19

Aside from replacing the silicone composition obtained in Example 17 with the silicone composition obtained in Comparative Example 15, an emulsion composition was formulated and prepared in the same way as in Example 26.

Comparative Example 20

Aside from replacing the silicone composition obtained in Example 17 with the organopolysiloxane of formula (C) obtained in Synthesis Example 5, an emulsion composition was formulated and prepared in the same way as in Example 26.

[Evaluation Tests]

The following evaluation tests were carried out on each of the emulsion compositions. The results are shown in Table 4.

3. Softness

A test liquid was prepared by adding deionized water to the emulsion composition and diluting to a solids concentration of 0.5 wt %. A polyester/cotton broadcloth (65%/35%, from Tanigashira Shoten) was dipped for 1 minute in the test liquid, after which the cloth was squeezed using rolls at a squeezing ratio of 100%, dried for 2 minutes at 100° C., and then additionally heat-treated for 2 minutes at 150° C., thereby producing a treated cloth for softness evaluation. A panel of three judges tested the treated cloth by touching it with their hands and rated the softness according to the following criteria.

<Evaluation Criteria>
A: Very pleasant to the touch
B: Pleasant to the touch
C: Unpleasant to the touch 4. Water Absorbency A test liquid was prepared by adding deionized water to the emulsion composition and diluting to a solids concentration of 2 wt %. A polyester/cotton broadcloth (65%/35%, from Tanigashira Shoten) was dipped for 10 seconds in the test liquid, after which the cloth was squeezed using rolls at a squeezing ratio of 100% and dried for 2 minutes at 130° C. A single drop (25 μL) of tap water was deposited with a dropping pipette on the treated cloth, and the time in seconds until the drop was completely absorbed by the cloth was measured.

5. Wash Durability

A test liquid was prepared by adding deionized water to the emulsion composition and diluting to a solids concentration of 2%. A polyester/cotton broadcloth (65%/35%, from Tanigashira Shoten) was dipped for 10 seconds in the test liquid, after which the cloth was squeezed using rolls at a squeezing ratio of 100% and dried for 2 minutes at 130° C. The treated cloth was then washed a single time with a washing machine by a procedure in accordance with JIS L0217 103. The amount of silicone remaining on the fiber surfaces after a single wash was measured with a fluorescence x-ray spectrometer (Rigaku Corporation) and calculated as the remaining ratio (%) compared with when washing was not carried out.

TABLE 4

| | Silicone composition | Softness | Water absorbency (seconds) | Wash durability (%) |
|---|---|---|---|---|
| Example 26 | Example 17 | A | 8 | 65 |
| Example 27 | Example 18 | A | 7 | 62 |
| Example 28 | Example 19 | A | 7 | 63 |
| Example 29 | Example 20 | A | 9 | 69 |
| Example 30 | Example 21 | A | 5 | 38 |
| Example 31 | Example 22 | A | 8 | 58 |
| Example 32 | Example 23 | A | 6 | 56 |
| Example 33 | Example 24 | A | 8 | 70 |
| Example 34 | Example 25 | A | 8 | 54 |
| Comparative Example 16 | Comparative Example 12 | A | 9 | 12 |
| Comparative Example 17 | Comparative Example 13 | A | 8 | 10 |
| Comparative Example 18 | Comparative Example 14 | A | 7 | 7 |
| Comparative Example 19 | Comparative Example 15 | B | 10 | 70 |
| Comparative Example 20 | Organopolysiloxane of formula (C) | A | 7 | 6 |
| Untreated cloth | | C | 15 | |

As shown in Table 3, the silicone compositions of the invention have an excellent low-temperature curability and shelf stability. Also, as shown in Table 4, textile treatments using silicone compositions according to the invention are able to impart good softness and water absorbency to textiles, and also have an excellent wash durability.

INDUSTRIAL APPLICABILITY

The silicone compositions of the invention have an excellent low-temperature curability. When used in textile treatments, they can impart textiles with good softness. In addition, they have an excellent wash durability and thus can be used as high-durability binder resins.

The invention claimed is:
1. A silicone composition comprising:
(A') 70 to 98 parts by weight of an organopolysiloxane having, at an end of the molecule or on a side chain, a group of general formula (5) below

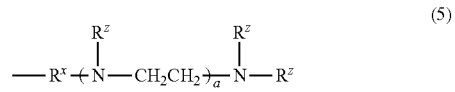

wherein
$R^x$ is a divalent hydrocarbon group of 1 to 8 carbon atoms; the letter "a" is an integer from 0 to 4; and
each $R^z$ is independently a hydrogen atom, a monovalent hydrocarbon group of 1 to 10 carbon atoms, an acyl group or the polyoxyalkylene-containing organic group —$CH_2$—$CH(OH)CH_2O$—$(C_2H_4O)_b$—$(C_3H_6O)_c$—Z, wherein Z is (a hydrogen atom, a substituted or unsubstituted monovalent hydrocarbon group of 1 to 12 carbon atoms or an acyl group, b being an integer from 2 to 30, c being an integer from 0 to 20, and the oxyethylene and oxypropylene units optionally forming a block polymer or a random polymer, with the proviso that at least 90% of the total number of $R^z$ groups are —$CH_2$—$CH(OH)CH_2O$—$(C_2H_4O)_b$—$(C_3H_6O)_c$—Z groups; and
(B) 2 to 30 parts by weight of a blocked polyisocyanate which has at least two isocyanate groups per molecule, at least 50 mol % of the isocyanate groups being capped with a thermally labile blocking agent.

2. The silicone composition of claim 1, wherein component (A') is selected from among organopolysiloxanes of general formulas (6) to (8) below

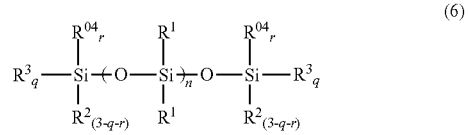

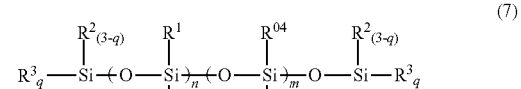

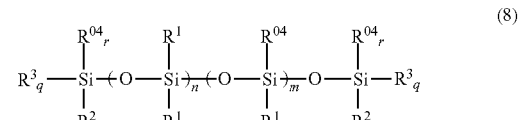

wherein
each $R^{04}$ of general formula (6) to (8) is independently a group of general formula (5) below

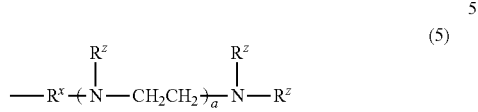 (5)

wherein $R^x$ is a divalent hydrocarbon group of 1 to 8 carbon atoms; the letter "a" is an integer from 0 to 4; and each $R^z$ is independently a hydrogen atom, a monovalent hydrocarbon group of 1 to 10 carbon atoms, an acyl group or the polyoxyalkylene-containing organic group —$CH_2$—$CH(OH)CH_2O$—$(C_2H_4O)_b$—$(C_3H_6O)_c$—Z, wherein Z is a hydrogen atom, a substituted or unsubstituted monovalent hydrocarbon group of 1 to 12 carbon atoms or an acyl group, b is an integer from 2 to 30, c is an integer from 0 to 20, and the oxyethylene and oxypropylene units optionally form a block polymer or a random polymer, with the proviso that at least 90% of the total number of $R^z$ groups are —$CH_2$—$CH(OH)CH_2O$—$(C_2H_4O)_b$—$(C_3H_6O)_c$—Z groups); each $R^2$ is independently a substituted or unsubstituted monovalent hydrocarbon group of 1 to 12 carbon atoms; each $R^3$ is independently the group —OX, wherein X is a hydrogen atom or a substituted or unsubstituted monovalent hydrocarbon group of 1 to 12 carbon atoms; each $R^1$ is independently a group selected from the options for $R^2$ or $R^3$; each q is independently an integer from 0 to 3 and each r is independently 0 or 1, such that the sum q+r is 0 to 3 at each end, with the proviso that at least one end in formula (6) and formula (8) has a $R^{04}$; n is an integer from 10 to 500; and m is an integer from 1 to 10.

3. The silicone composition of claim 1, wherein component (B) is a blocked polyisocyanate obtained by using a heat-labile blocking agent to cap a polyisocyanate compound polymerized from an aliphatic and/or alicyclic diisocyanate.

4. The silicone composition of claim 1, wherein the thermally labile blocking agent of component (B) is at least one compound selected from the group consisting of oxime compounds, pyrazole compounds and active ethylene compounds.

5. A silicone composition comprising a reaction product of
at least one NH group included in an organopolysiloxane of component (A'), wherein component (A') is 70 to 98 parts by weight of an organopolysiloxane having, at an end of the molecule or on a side chain, a group of general formula (5)

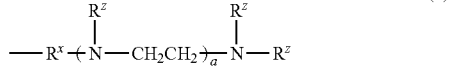 (5)

wherein $R^x$ is a divalent hydrocarbon group of 1 to 8 carbon atoms, the letter "a" is an integer from 0 to 4, and each $R^z$ is independently a hydrogen atom, a monovalent hydrocarbon group of 1 to 10 carbon atoms, an acyl group or the polyoxyalkylene-containing organic group —$CH_2$—$CH(OH)CH_2O$—$(C_2H_4O)_b$—$(C_3H_6O)_c$—Z, wherein Z is a hydrogen atom, a substituted or unsubstituted monovalent hydrocarbon group of 1 to 12 carbon atoms or an acyl group, b being an integer from 2 to 30, c being an integer from 0 to 20, and the oxyethylene and oxypropylene units optionally forming a block polymer or a random polymer, with the proviso that at least 90% of the total number of $R^z$ groups are —$CH_2$—$CH(OH)CH_2O$—$(C_2H_4O)_b$—$(C_3H_6O)_c$—Z groups,
with an isocyanate group of component (B), wherein component (B) is 2 to 30 parts by weight of a polyisocyanate which has at least two isocyanate groups per molecule.

6. A silicone emulsion composition comprising the silicone composition of claim 1.

7. A textile treatment comprising the silicone composition of claim 1.

8. The textile treatment of claim 7, wherein the silicone composition of claim 1 is dissolved in an organic solvent, said silicone composition comprising 0.1 to 40 weight-% of said textile treatment.

9. The silicone emulsion composition of claim 6, wherein the silicone composition of claim 3 comprises 20 to 40 weight-% of said silicone emulsion composition.

10. The silicone composition of claim 4, wherein component (A') is an organopolysiloxane of the formula

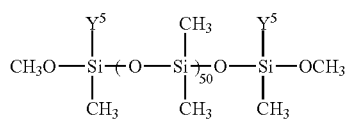

in which the variable $Y^5$ represents —$C_3H_6NHC_2H_4NH_2$.

* * * * *